United States Patent [19]

Baker et al.

[11] Patent Number: 5,299,125
[45] Date of Patent: Mar. 29, 1994

[54] NATURAL LANGUAGE PROCESSING SYSTEM AND METHOD FOR PARSING A PLURALITY OF INPUT SYMBOL SEQUENCES INTO SYNTACTICALLY OR PRAGMATICALLY CORRECT WORD MESSAGES

[75] Inventors: Bruce R. Baker; Eric H. Nyberg, both of Pittsburgh, Pa.

[73] Assignee: Semantic Compaction Systems, Pittsburgh, Pa.

[21] Appl. No.: 15,290

[22] Filed: Feb. 8, 1993

Related U.S. Application Data

[63] Continuation of Ser. No. 564,835, Aug. 9, 1990, abandoned.

[51] Int. Cl.$^5$ .............................................. G06F 15/40
[52] U.S. Cl. .................................. 364/419.08; 434/112
[58] Field of Search .................. 364/419; 395/2; 400/485–487, 489; 434/112, 116; 340/706, 711, 712, 825.19; 341/20–23

[56] References Cited

U.S. PATENT DOCUMENTS

| | | | |
|---|---|---|---|
| 3,781,802 | 12/1973 | Kafafian | 434/112 |
| 3,925,779 | 12/1975 | Gerstenhaber | 434/112 |
| 4,211,497 | 7/1980 | Montgomery . | |
| 4,484,305 | 11/1984 | Ho . | |
| 4,650,423 | 3/1987 | Sprague et al. . | |
| 4,656,603 | 4/1987 | Dunn . | |
| 4,661,916 | 4/1987 | Baker et al. . | |
| 4,785,420 | 11/1988 | Little | 392/2 |
| 4,795,349 | 1/1989 | Sprague et al. | 400/485 |
| 4,908,845 | 3/1990 | Little | 395/2 |
| 4,927,279 | 5/1990 | Morgan . | |
| 4,994,968 | 2/1991 | Kato et al. | 364/419 |

OTHER PUBLICATIONS

IBM Technical Disclosure, C. P. Ludeman, "Phonetic/Grammatic Keyboard Device", vol. 19, No. 8, Jan. 1977 pp. 2860–2864.
IBM Technical Disclosure Bulletin, vol. 19, No. 8, to Ludemann.
IBM Technical Disclosure Bulletin, vol. 24, No. 2, to Svigals.
Euroconference 1977 Proceedings on Communication Document to Cossalter et al.
IBM Technical Disclosure, vol. 19, No. 5, to Sading.
Medical and Biological Engineering and Computing Article to Shvedyk et al.
"Iconic Interfaces in Intelligence AAC Systems", Bruce R. Baker et al., RESNA 13th Annual Conference, Jun., 1990.

*Primary Examiner*—Gail O. Hayes

[57] ABSTRACT

A Natural Language Processing System utilizes a symbol parsing layer in combination with an intelligent word parsing layer to produce a syntactically or pragmatically correct output sentence or other word message. Initially, a plurality of polysemic symbol sequences are input through a keyboard segmented into a plurality of semantic, syntactic, or pragmatic segments including agent, action and patient segments, for example. One polysemic symbol sequence, including a plurality of polysemic symbols, is input from each of the three segments of the keyboard. A symbol parsing device, in a symbol parsing layer, then parses each of the plurality of symbols in each polysemic symbol sequence to access a previously stored word, morpheme, or phrase. The word, morpheme, or phrase is accessed which corresponds to the polysemic symbol sequence and further corresponds to one of the designated agent, action or patient segments. Each accessed word, morpheme, or phrase further accesses corresponding and previously stored grammatical and semantic information. An intelligent word parsing layer then receives and subsequently applies each of the plurality of words, morphemes, or phrases to a predetermined hierarchy of rules based upon the grammatical and semantic information corresponding to each of the plurality of words, morphemes, or phrases. The intelligent word parsing device in the word parsing layer subsequently parses the received plurality of accessed words, morphemes, or phrases into a syntactically or pragmatically correct output sentence or other word message.

83 Claims, 7 Drawing Sheets

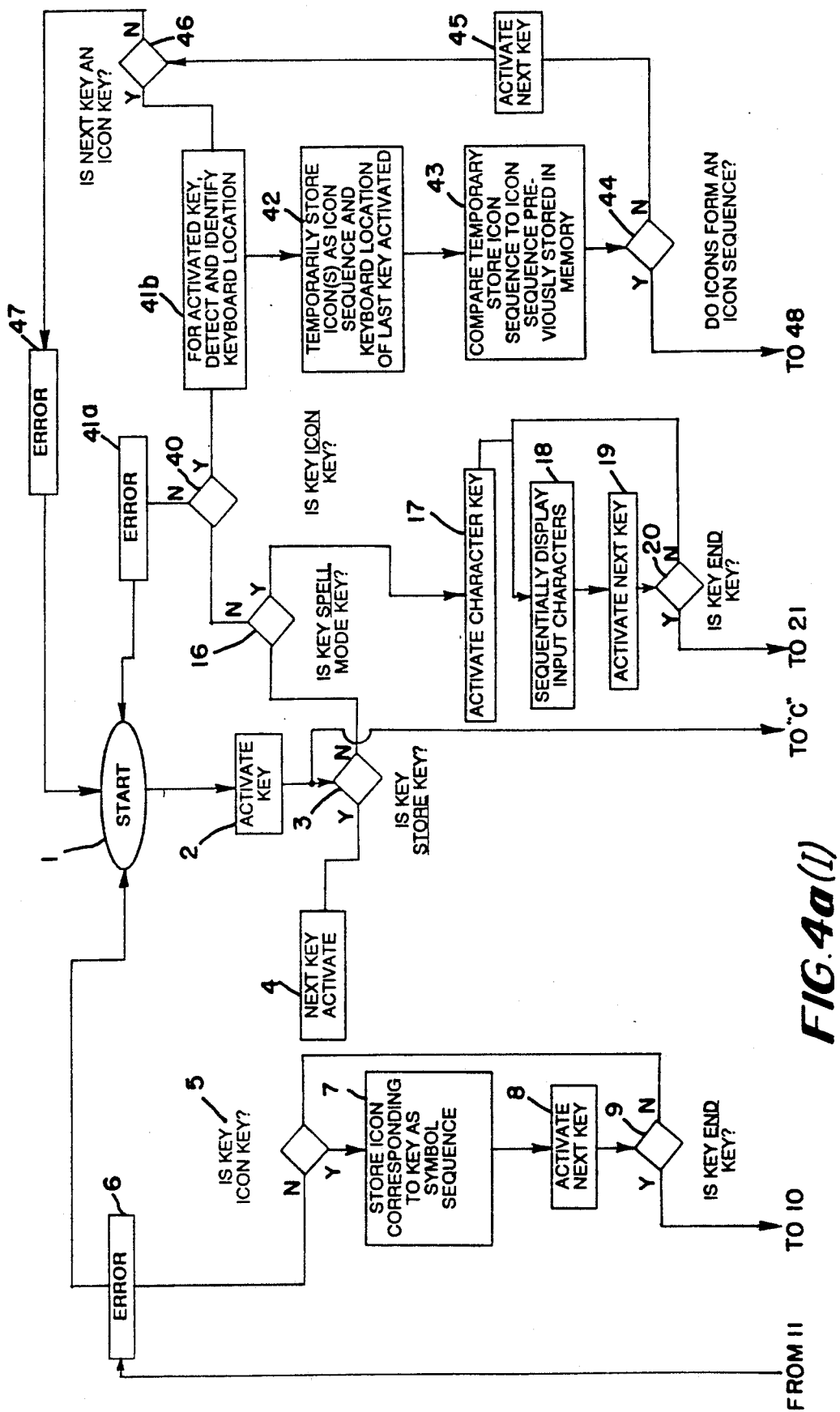
FIG.4a(1)

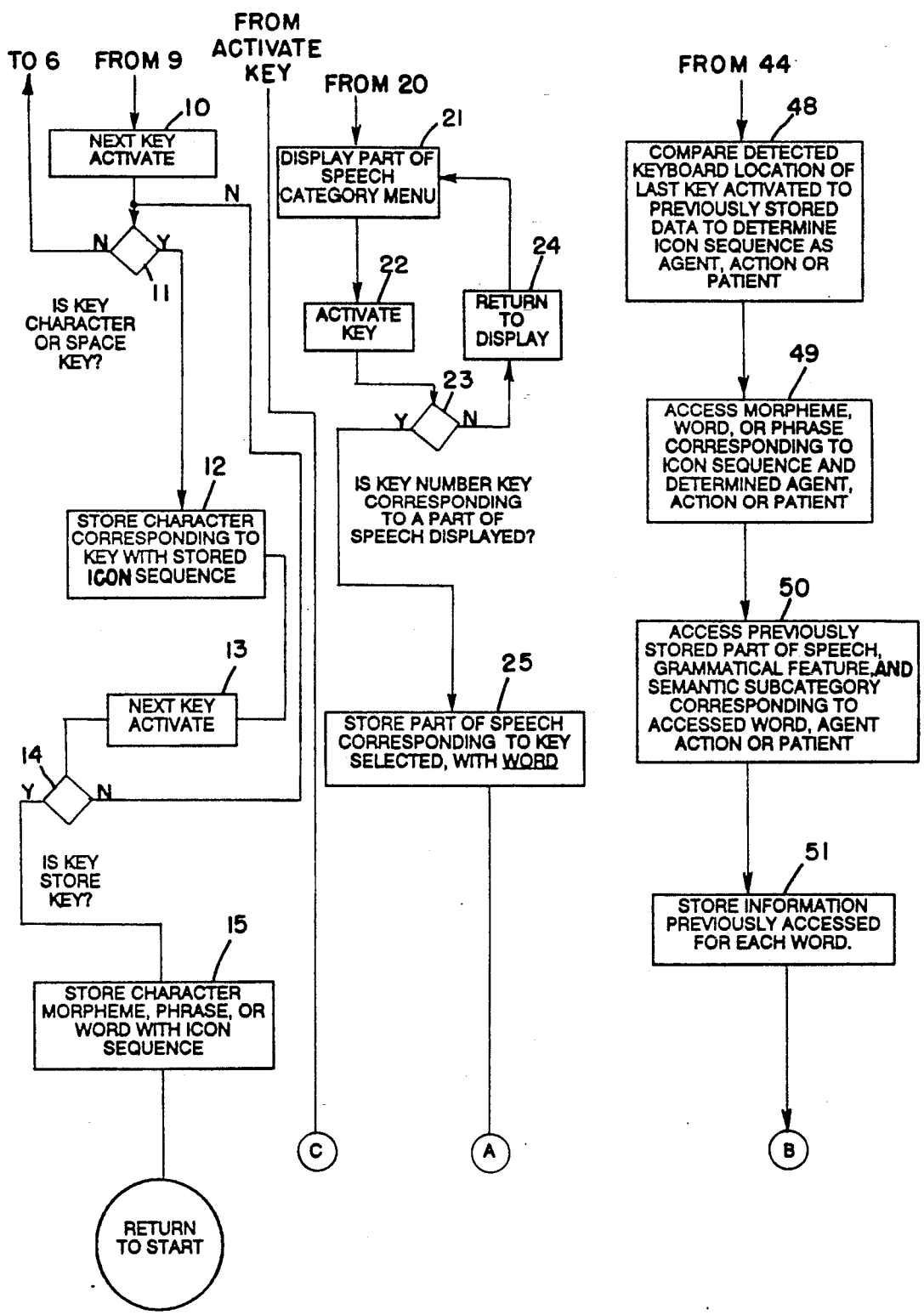
FIG. 4a(II)

NATURAL LANGUAGE PROCESSING SYSTEM AND METHOD FOR PARSING A PLURALITY OF INPUT SYMBOL SEQUENCES INTO SYNTACTICALLY OR PRAGMATICALLY CORRECT WORD MESSAGES

This application is a continuation of application Ser. No. 07/564,835 filed on Aug. 9, 1990, now abandoned.

BACKGROUND OF THE INVENTION

The present invention relates to a natural language processing system in general, and more particularly relates to a system for initially parsing a plurality of symbols and subsequently parsing a plurality of words, morphemes, or phrases to produce a syntactically or pragmatically correct output sentence.

A system and method for producing synthetic plural word messages for use by people unable to use their own voices is known in the speech synthesizing arts. The system was originally implemented as a linguistic coding system with an associated keyboard, in which the coding system was based on a symbol rather than a word, phoneme or letter. Such a system is disclosed in U.S. Pat. No. 4,661,916 to Baker et al issued Apr. 28, 1987.

In such a system, the keyboard is coupled to a computer which stores a plurality of plural word messages in a memory thereof for selective retrieval by the keyboard. The plural word messages retrieved by the keyboard are fed to a voice synthesizer which converts them through a loudspeaker to achieve audible messages. The keyboard utilizes polysemic (many-meaning) symbols or icons on the respective keys and by designating one or more of the keys and its associated polysemic symbols, selected previously recorded plural word messages from the computer memory may be retrieved in a simple transduction manner. The messages in memory are retrieved by actuating a particular sequence of a plurality of keys, to vary the context of the polysemic symbols. Thus, a plurality of sentences associated with each key in a particular sequence with a plurality of other keys may be selectively generated as a function of each polysemic symbol in combination with other symbols to access the plural word message or sentence.

Since such a communication aid is designed to be adaptable to either people of high intellect and education who are physically unable to speak or people with decreased cognitive abilities or little education, a system which is both easy to understand and operate, as well as quick and efficient, is necessary. Further, it is essential that both the cognitive and physical loads required by the user are reduced as much as possible. However, systems other than Baker '916 for synthetic speech, or typing devices, which have coding systems based on words, phonemes, or letters to be implemented by keyboards with indicia thereon relating to the words, phonemes, or letters are somewhat limited in efficiency of operation.

In utilizing a system based upon letters, for example, a limited number of keys could be utilized (i.e., 26 letters in the alphabet). However, such a system utilizing letters has several drawbacks. One drawback is that in a system for people physically unable to speak or who are cognitively impaired, spelling is difficult to master. People who can't articulate the sounds of a language have a limited ability to deal with letters. Finally, in utilizing letters one must type a large number of letters in a sequence to form a word, phrase and especially a sentence. Such a large number of keystrokes is especially cumbersome for someone with decreased cognitive or physical abilities.

In order to combat the problem of the need for a large number of letters in a sequence, single meaning picture or symbol approaches have been developed. In these systems, a symbol or picture can be utilized to represent a single basic concept or word. Because these systems are based upon single concepts or words and not letters, only a few symbols need be utilized, in sequence to represent a phrase or sentence. However, the major drawback of these systems is different from letter based systems. Although only a few symbols are necessary to form a sequence, many hundreds of symbols could be necessary to represent enough vocabulary to interact at home, at school or in the workplace. Thus, hundreds and even thousands of symbols could be necessary for a user to choose from. These large symbol sets are not only physically difficult (if not impossible) to represent on a keyboard, but also put a severe strain on the cognitive and physical abilities of a user both to choose a symbol from the large symbol set and further to key in the selected symbol.

Various techniques have been developed in an attempt to deal with the deficiencies of either the need for a large number of letters to form a sentence in a letter-based system; or the need for a large symbol set to represent all the notions or vocabulary necessary for daily interactions in a single-meaning picture/symbol system. One approach aimed at combating the long sequences of letters necessary in a letter system is to use alphabetic abbreviations. With such systems a user was unsure as to what each abbreviation stood for, for example, (wk) could stand for "walk" and (wo) could stand for "word", but what would stand for "work". The user could become confused and think either (wk) or (wo) stood for "work".

Another attempt to alleviate the large number of keystrokes needed in spelling was word/letter prediction systems. In such systems, a user would type a letter such as "B" and five words starting with "B" would appear on a display. Upon not finding the desired word displayed, an operator would then hit the next letter "0" of the desired word (if the desired word were "Bottle" for example). If the desired word is then displayed on the word list the number next to the desired word is noted and then hit. Such systems are highly visual requiring attention directed at two different fields, the keyboard and the screen. And these systems require operators to have strong spelling abilities (if he hit the wrong letter such as a "C" when the word "kitten" was desired, prediction would start with five words beginning with "C" and the user would be lost) and further, it was cognitively disorienting because it required the user to key a letter, read word lists on a display, key in another letter, select a number, etc.

Levels/locations systems were developed in an attempt to alleviate the large symbol set of single meaning picture/symbol systems. In such systems, a plurality of keyboard overlays were utilized. Each overlay contained a plurality of single-meaning pictures or symbols for a particular activity For example, there was a "party" overlay, a "going to the zoo" overlay, an A.M. activities overlay, etc. However, although only a limited number of symbols were on a keyboard at one time, the system severely limited a user's vocabulary at all times. For example, if there were 7 overlays, when a user had one on the keyboard, 85% of his vocabulary was unavailable to him, it being on the other six overlays. Thus, the abilities of a user were severely limited.

The linguistic coding system of Baker et al, U.S. Pat. No. 4,661,916, thereby solved a great number of these problems by employing a technique called semantic compaction. Semantic compaction utilized a keyboard with polysemic (many-meaning) symbols or icons on the respective keys. These polysemic symbols allowed for a small symbol set (each symbol having many different meanings depending upon other symbols in combination) and further allowed for utilization of only a small number of symbols in a sequence to transduce a previously stored word, phrase, or sentence. An example of the polysemic symbols of the Baker '916 patent are shown in FIG. 1. Thus by input of only a limited number of polysemic keys, a sentence or other plural word message can be selectively retrieved. The sentence can then be sent to a voice synthesizer to convert it, through a loudspeaker, to an audible spoken message. This device is a synthetic speech device which allows a user to go directly from thought to speech without the need to record words, phonemes and letter data of individual entities.

The Baker device retrieves and stores whole sentences and plural word messages for selective retrieval, and not just individual words, phonemes, or letters. By using these polysemic symbols, in combination, only a small number of key actuations are necessary to represent a sentence or plural word message. These iconic polysemic symbols or "icons" for short, as they are more commonly known, on the individual keys, were made so as to correspond to pictorial illustrations of real life objects, as can be seen by reference to FIG. 1. These icons were utilized because such symbols were more easily memorized and more versatile than alphanumeric characters. Therefore, a user of low intellect, or one with a disability, would easily be able to access these icons representing real life objects to thus access plural word messages and thereby have these messages synthesized for output speech.

Large repertories of words, sentences and phrases were available and used by operators with a wide range of physical and cognitive disabilities. Many operators handled repertories in excess of 3000 vocabulary units.

However, although the system of Baker et al '916 is a revolutionary breakthrough in augmentative and alternative communication (AAC), there is still room for improvement over an iconic system utilized which produces synthetic word messages. The system of Baker '916, utilizes a simple transduction algorithm wherein a plurality of plural word messages or sentences are initially stored in a memory corresponding to a particular sequence of icons. Upon the user activating that particular sequence of icons, the corresponding plural word message or sentence are directly accessed from memory, sent to a voice synthesizer, and converted through a loudspeaker to achieve audible spoken messages. However, as previously mentioned, such a system merely utilizes simple transduction of a previously stored word message, that is words, phrases or sentences accessed via a particular sequence of polysemic symbols or icons.

The use of symbol parsing technology in Baker '916 was a revolutionary breakthrough but was limited to this simple transduction model. Although a finite-state transducer is easy to program into a small microchip, it is also inflexible and cannot anticipate the user's intentions the way a more intelligent parsing technology can. A system is desired in which users can have the greater freedom of icon selection, not having to worry about the precise ordering or completeness of an icon sequence, as well as a system having even fewer key actuations than a system such as Baker '916. Such a system, reducing the requirements of the user as well as reducing the number of necessary icons, can be achieved through intelligent parsing. A further reduction in the number of selections and the field of selections that such intelligent parsing can produce may be a substantial aid not only to those individuals who are cognitively intact and have intact language, but also to individuals who are cognitively impaired or have serious language deficiencies.

A natural language processing system is desired which further reduces both the cognitive and physical loads on the user. If the user is required to remember not only what concepts each icon represents, but also how to assign grammatical functions, morphological inflections, etc., then a smaller number of users will be successful. This is particularly true for potential system operators who have had strokes or experienced congenital, cognitive impairments. However, if the system can anticipate what is intended (for example, inferring that an action should be uttered as a particular inflection of a verb by taking into account subject-verb agreement) then the cognitive load of the user is reduced, since less information must be remembered and conveyed to complete an utterance.

In reducing the physical load, the number of keys can be reduced by eliminating entire classes of keys (like those that inflect verbs and verb tense) since fewer key actuations will be required. A reduction in key actuations greatly improves the quality of the user's interaction, especially for users with limited capabilities.

It is desired to combine parsing technology with interface technology to produce a successful device. These two technologies must be in balance so that the user's expectations are not violated. If the user is presented with an elegant interface that has little functionality behind it, he will become quickly disillusioned. Consequently, if the user is presented with a device that has an inadequate interface and excellent functionality, he will rapidly become frustrated. It is an unfortunate downfall of many computer systems in present technology that rely too much on fancy graphics to make up for a lack of real capability. The existing linguistic coding system of Baker et al '916, has an excellent balance between accessibility and functionality which should be preserved.

It is further preferred to design a system which uses particular semantic relationships among polysemic icons (multi-meaning symbols or pictographs) to assign a meaning to a sequence of key actuations made by a user. A sequence of icons may be associated with a particular language item, such as a morpheme, word, phrase or plurality of words, to be output when that particular icon sequence is actuated. Icons can be utilized to access language items and thus do what letters, single meaning pictures, words, and numbers cannot. Clearly, there are certain associations that can be made with both an icon and the word representing that icon. For example, it is easy to make the association with the word "food" when presented with either a picture of an apple or the word "APPLE". However, it is clear that there are certain kinds of association that can be made consistently and unambiguously with icons, although certain exceptions may hold.

For example, the greatest advantage that icons have over numbers, letters and words, is that, as pictographs, they each have distinct visual features that can be made easily transparent (translucent) to the user. For example, each icon has a shape, and a color, and picture some object which may have other visual properties as well. Although some symbols have shapes which are readily accessed (for example, 0, I, X, A), the abstract shapes of symbols are not unambiguous; the more abstract an association, the greater the chance the user will not prefer the intended interpretation. For example, "A" can be associated with a house or a mountain or a tall building, the tip of a pencil, etc. Since the shape of "A" is so abstract, many associations are possible. An icon of "house", however, is not subject to the same ambiguity.

Some systems have attempted to use letter coding to associate letters with concepts; however, this method of encoding is also prey to ambiguous interpretation. For example, a reasonable letter coding for the color "RED" would be the letter "R"; for "BLUE", the coding would be "B". However, what happens with the color "BROWN"?. The logical choice would also be "B", but a conflict arises with the code chosen for "BLUE". The same problem arises as in the previous example; since there are literally thousands of words which can be associated with a single letter, a letter-coded system rapidly runs out of coding space and is therefore limited in the number of concepts it can encode unambiguously.

Letter codes can be done in various ways. Two of the most common ways to encode plural word messages are called "salient letter encoding" and "semantic encoding". Salient letter encoding takes the initial letter of two or more fundamental words in the language string to be represented and uses them for the code. For example, "Turn the radio off" can be encoded as "RO" using this method. The problem arises that after many utterances, the same letters "RO" are needed to represent other language strings. For instance, "RO" are the most salient letters for "Turn the radio on". A strategy must then be employed to find other salient letters so that the ambiguity is avoided. Hence, "Turn the radio on" must be encoded using a different code such as "TO" or "TR". However, these letter combinations in turn can represent other common phrases such as "Take it off" or "Turn right". As the language corpus grows larger, the task of finding other unique combinations of salient letters becomes more and more difficult and by necessity must include codes that are less and less salient and more difficult to learn. After 500–1000 units are encoded, the codes become virtually arbitrary.

Semantic encoding takes letters to associate with concepts rather than individual words, so that "F" can be taken to represent food. The plural word message "I would like a hamburger" would then be encoded by "FH". The difficulty here is that "F" can represent many different concepts and must be used not only for "food" but for concepts such as "fast", "friends", etc. If each letter is assigned a single concept, a language corpus represented by the combinations of twenty-six root concepts would indeed be impoverished. If letters are allowed to represent one concept in initializing a sequence, and other concepts as second or third members of a sequence, this disambiguating what concept a letter means across a string of three letters becomes a difficult if not impossible task once the language corpus has grown to five hundred units or more.

A system is necessary which incorporates ideas from research and knowledge representation and natural language processing. The goal of knowledge representation research is representing an acquired knowledge from everyday domains (e.g., task planning, language understanding) that can be used by intelligent computer programs. The goal of natural language processing research is to investigate in particular the knowledge that is required for a computer program to understand and produce sentences in English or some other natural language.

It can be said that the intelligence of a system is determined by how much it knows. Before a computer can show an understanding of a linguistically complex utterance, it must have a significant body of knowledge about morphology, word meaning, syntax, etc. In order to support intelligent processing, much linguistic knowledge must be incorporated into the system.

The system may not only combine the symbol parsing of multi-meaning sequence icons along with intelligent word parsing, but further utilize a well-chosen geographic layout which can provide the system with syntactic and semantic information based on the locations of the icons which are selected. This therefore reduces knowledge and inferencing required by the intelligent word parser.

SUMMARY OF THE INVENTION

The present invention is directed to a natural language processing system for initially parsing each of a plurality of sequences of input polysemic symbols, each sequence including a plurality of input polysemic symbols, to produce a word, phrase, or morpheme, and subsequently parsing each of the single morphemes, words, or phrases into a syntactically or pragmatically correct word message output.

The system includes an input device, segmented into a plurality of syntactic, semantic, or pragmatic segments, each such segment including a plurality of keys. Each key includes one of the plurality of polysemic symbols. Upon actuation of an input key, a particular polysemic symbol is accessed and further syntactic, semantic or pragmatic segment information designating each corresponding polysemic symbol as one of an agent, action and patient, for example, is entered into the system.

A symbol parsing layer is then included for parsing a plurality of sequentially accessed polysemic symbols into a plurality input symbol sequences. The symbol parsing layer then accesses each of the phrases, words, or morphemes previously stored with a symbol sequence, corresponding to each of the input symbol sequences and further corresponding to one of the designated syntactic, semantic, or pragmatic segments. Each accessed word, phrase, or morpheme further accesses corresponding, and previously stored, grammatical and semantic information.

Finally, an intelligent word parsing layer receives and subsequently applies each of the plurality of accessed words, phrases, or morphemes to a predetermined set of rules and, based upon the corresponding grammatical and semantical information, parses the received plurality of accessed words, phrases, or morphemes into a syntactically or pragmatically correct output sentence or other word message.

The terms "syntactic," "semantic" and "pragmatic" information used throughout this description are all encompassed by the generic term "linguistic knowledge." It should also be understood that the terms "syntactic" and "semantic" information are encompassed by the generic term "grammatical" information. Therefore, in the following description and appended claims the relationship of these terms should be clear in the context of the present invention.

It is therefore an object of the present invention to employ a system utilizing an input device, containing a plurality of multi-meaning icons, which is arranged in a well-chosen geographic layout such that actuation of a particular key can provide the system with syntactic, semantic, or pragmatic information based on the location of an icon selected, thus reducing knowledge and inferencing required by a subsequent intelligent word parser.

It is another object of the present invention to employ a symbol parsing layer in combination with an intelligent word parsing layer to produce an syntactically or pragmatically correct output sentence or other word message.

It is a further object of the present invention to utilize input sequences of polysemic symbols to exploit the natural polysemia inherent in illustrations of real-life objects, to allow a cognizantly impaired user easy access of a particular corresponding single word, morpheme or plural word phrase.

It is a further object of the present invention to combine artificial intelligence and linguistic techniques to reduce the syntactic and cognitive load burdens on an operator, as well as the physical load.

It is a further object of the present invention to utilize an intelligent word parser to produce a syntactically and semantically well formulated sentence, or pragmatically correct sentence, by filling in the necessary syntactic information (e.g., determinators, prepositions, necessary verb inflections) to produce a sentence upon initial input of an agent, action and patient.

It is a still further object of the present invention to have a system which allows a user to input a particular word, phrase, or morpheme, personal to him, and to designate a particular symbol sequence to correspond and subsequently access the particular word, morpheme, or phrase;

It is a still further object of the present invention to provide a menu driven system for designation of grammatical and semantic information to be stored with a particular personal word, phrase, or morpheme and its corresponding symbol sequence for subsequent use by an intelligent word parsing layer;

It is a further object of the present invention to utilize such an intelligent word parser to form the above-mentioned semantically and syntactically correct sentence irrespective of the order of the input agent, action and patient.

These and further objects of the present invention will become more readily apparent from a better understanding of the preferred embodiments as described below with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the invention, and wherein:

FIGS. 4a to 4c illustrate a flowchart corresponding to a method of operation in a preferred embodiment of the present invention;

The above-mentioned drawings will be described in detail in the following detailed description.

DETAILED DESCRIPTION OF THE PREFERRED EMBODIMENTS

Figure 1:
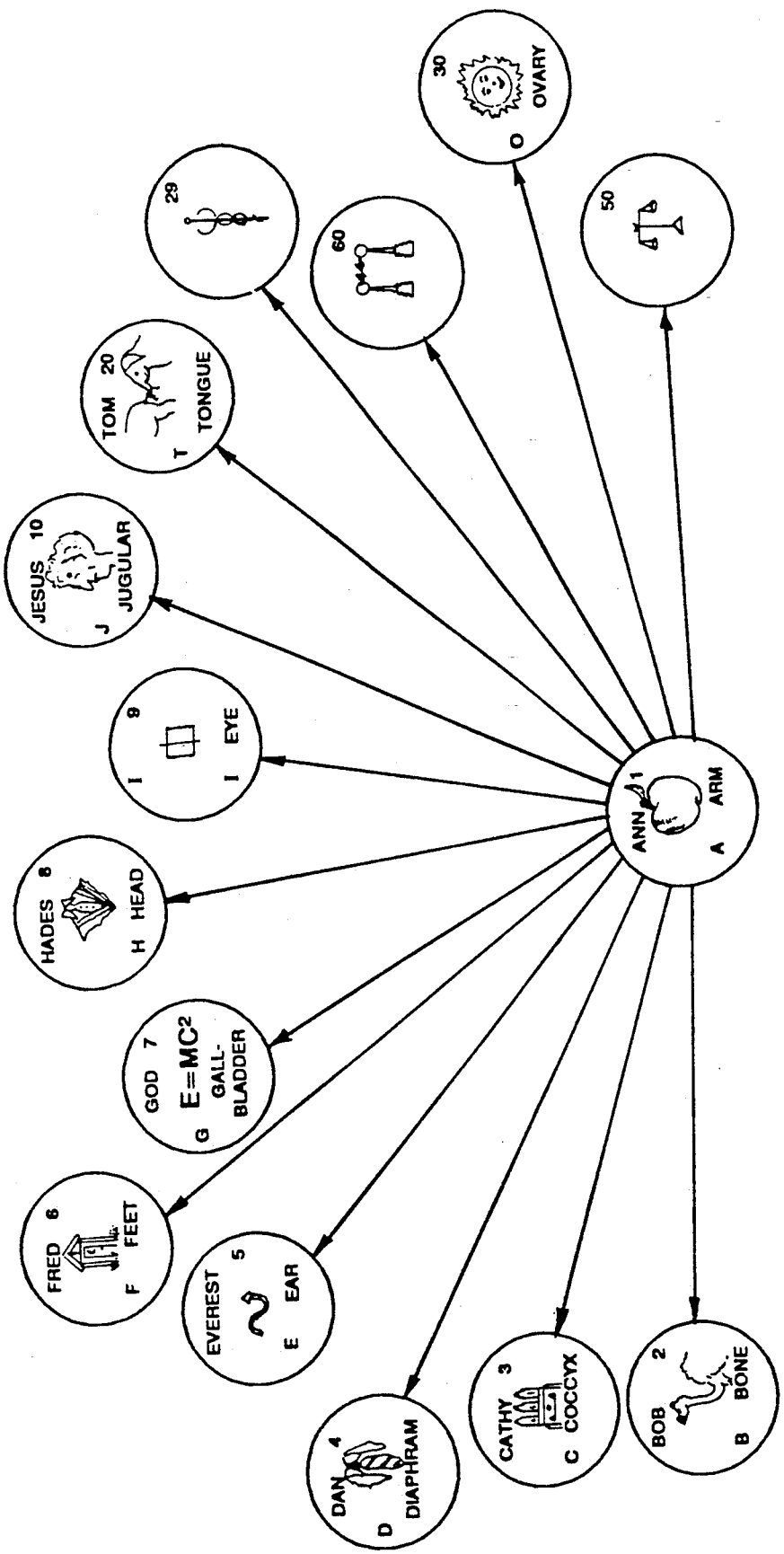
FIG. 1 illustrates a plurality of examples of polysemic symbols useable on the input unit of the system described in the aforementioned Baker '916 patent.
Figure 2:
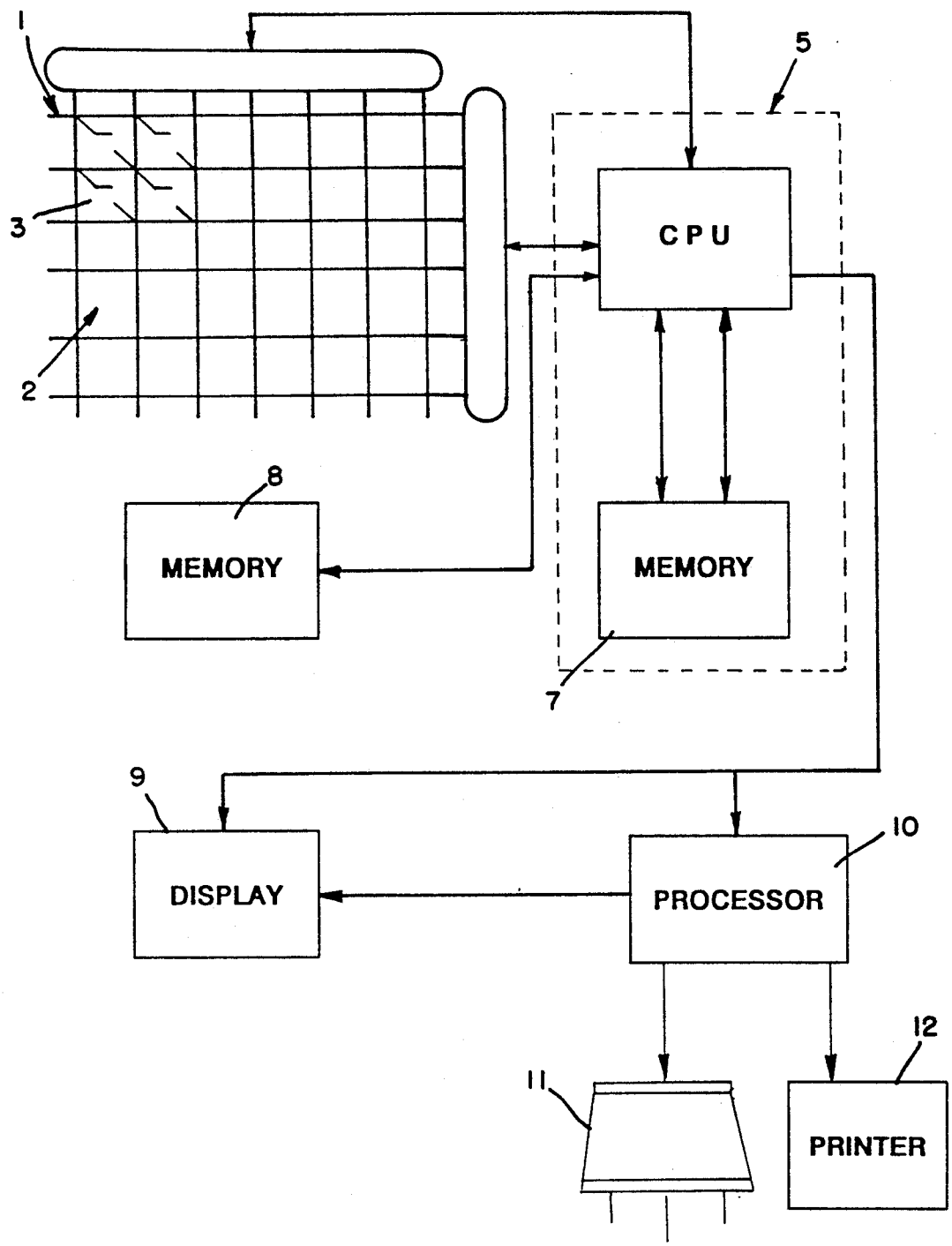
FIG. 2 illustrates the input system of the present invention in conjunction with parsing devices, a processing device, and output units.

FIG. 2 illustrates a system of preferred embodiment of the present invention. In this preferred embodiment, the keyboard or input system 1 of the present invention is shown in conjunction with a symbol parsing device 5 including CPU 6 and memory 7, a word parsing device including memory 8, a processor 10, and various output devices display 9, speaker 11, and printer 12. The specialized processor 10 may be one of a speech synthesis system as will be described in this preferred embodiment or any other processing system, such as a language translater, for example. Further, in conjunction with the system of the present invention, one of a plurality of output devices may be utilized by a user to express one of a plurality of syntactically or pragmatically correct output sentences achieved by the natural language processing system of the present invention. Preferably the memories 7 and 8 are erasable programmable read only memories (EPROMs). However, any suitable type of memory may be used and thus the present invention is not limited to EPROMs.

These output devices can be a printer 12 for expressing the syntactically or pragmatically correct output sentence in printed words; a speaker for outputting the output sentence in an audible form; a display device for displaying the output sentence or intermittent steps during processing of the output sentence; or the like. Still further, once the syntactically or pragmatically correct sentence or other word message has been processed and output by one of the plurality of output devices previously described, this output data can be further utilized in a further system such as that of telephonic communication system or the like. Therefore, if such a system is utilized by a physically handicapped or disabled person, they are still able to communicate with the outside world in a similar manner to a person with normal ability. Therefore, the natural language processing system of the present invention, for use in conjunction with a plurality of specialized processing devices such as processor 10, and the various output devices previously mentioned, is thus unlimited in its application to any type of communication system accessible to a person of normal ability.

FIG. 2, as previously described, illustrates a keyboard or input unit in a preferred embodiment in the present invention. The input unit or keyboard 1, in a preferred embodiment of the present invention, comprises a plurality of keys 2. Each key 2, when depressed or actuated, activates or closes a switch 3. The closure of the switch 3 is detected by the CPU 6. Therefore, by detecting an actuated key, the microprocessor 6 can determine the keyboard location and thus the polysemic symbol associated with the actuated key.

The keyboard is further divided or segmented into a plurality of, for example, three, syntactic segments, including agents, actions, and patients. The first syntactic segment, may correspond to, for example, agents. Three columns of eight keys per column, can be utilized to allow twenty-four keys to represent agents. Each of the keys includes one of a plurality of icons. An example of these icons, and further of each of the individual keys and syntactic segments of a keyboard preferably usuable in conjunction with the present invention, can be seen with regard to FIG. 3. Each of the icons, as previously described, are multi-meaning symbols which allow a user to produce sequences that are pedagogically expedient. As previously described, the use of icons is clearly superior to that of letters, words, and numbers and to allow a user the ability to access a plurality of previously stored words or phrases via a system which is both cognitively and physically expedient.

It should be noted that the number of keys per column and the number of columns per syntactic segment are merely exemplary and should not be considered limiting in any way. Additional syntactic segments can further be designated for, for example, segments for adjectives and adverbs. Also, pragmatic and semantic segments can further be designed and designated. In pragmatics, for example, information can be conveyed to turn a plurality of words from a statement into a question. Pragmatics deal with statements, questions, irony and how particular phrases are normally spoken. Thus, with pragmatic segments of the keyboard designated, information can be conveyed about inflection of words or phrases and thus can allow a user of the device of the present invention to communicate in an audible manner similar to the ways a person normally speaks.

By pressing and actuating keys from a pragmatic section of the keyboard, a user can eventually output a sentence which may be pragmatically correct although not syntactically correct. Thus, the final output, through an audible speaker, for example, may be a pragmatically, and not syntactically output sentence or other word message.

An example for utilization of pragmatics may exist for a person attempting to respond to the question "Do you want the whole pie or just a piece?". The user of the device of the present invention, by utilizing the proper polysemic symbol sequences from keys in a pragmatic section of the keyboard, and subsequently conveying the pragmatic information to the CPU 6 of the symbol parsing layer (in a similar manner as will subsequently be described with regard to syntactic information), and then reply "Just a piece". While the phrase "just a piece" is not a syntactically correct output sentence, it is pragmatically correct. Thus, through utilization of pragmatics, the intelligent word parsing layer or device would realize this is the desired output.

Further, a segment of the keyboard may be designated for semantics. A semantic segment, including a plurality of keys, could allow a user to select from a plurality of topics by accessing a single key. For example, by selecting a semantic key with a "shirt" symbol on it, the user would be conveying semantic information (in a similar manner as will be subsequently described with regard to syntactic information) to the CPU 6 of the symbol parsing layer indicating the topic of "clothes". Thus, secondary and a plurality of additional meanings can be derived from each of a plurality of subsequently activated keys. This semantic segment of the keyboard can be highly beneficial to a user to allow him to access desired information by topic.

The segmenting of the keyboard is preferably one of electronics, not physical segmentation. An additional bit, for example, may be detected by the the microprocessor to determine a syntactic, semantic, or pragmatic segment corresponding to an actuated key. Thus, the keyboard will appear to the user as 72 keys aligned in nine columns of eight keys per column. However, the use of physical separation of the keys into a plurality of syntactic, pragmatic, or semantic segments may also be utilized to aid the user. Further, the use of labels, labeling each of the segments, physically and/or electrically segmented, may also be utilized in conjunction with the present invention. The present invention further includes any other method of detection of keyboard segment designation within the purview of one of ordinary skill in the art.

The ideal keyboard, input device or interface represents input selections transparently and has a relatively small number of input choices or keys. An interface intended for individuals who are cognitively or physically impaired must generate language with a low number of actuations. Letters have serious problems as input media because they require six plus actuations per content word. Normal augmentative and alternative communication (AAC) operators have been known to select one key every five to eight seconds. Congenitally speech impaired people often have weak reading and spelling skills. Further, as an alternative to letters, single meaning pictures, as previously described, also have serious limitations because hundreds of pictures are required to initiate even the simplest vocabulary (with only one lexical item per picture).

The present device, in a preferred embodiment, utilizes and improves on the patented technique of semantic compaction shown in Baker '916, which approaches the problem of sentence, or word message, generation by interpreting symbols or icons to have different meanings in different context. This technique, usable in the preferred embodiment of the present invention, exploits the natural polysemia inherent in illustrations of real-life objects. For example, an apple is not only an apple, it is also red, a fruit and round. When used in a sentence describing a favorite color, an apple icon can be interpreted as indicating the color red. In general, this approach allows the operators to access a much larger number of concepts with the same number of input keys when multi-meaning icons are used in place of letters, words or single-meaning pictures.

Figure 3:
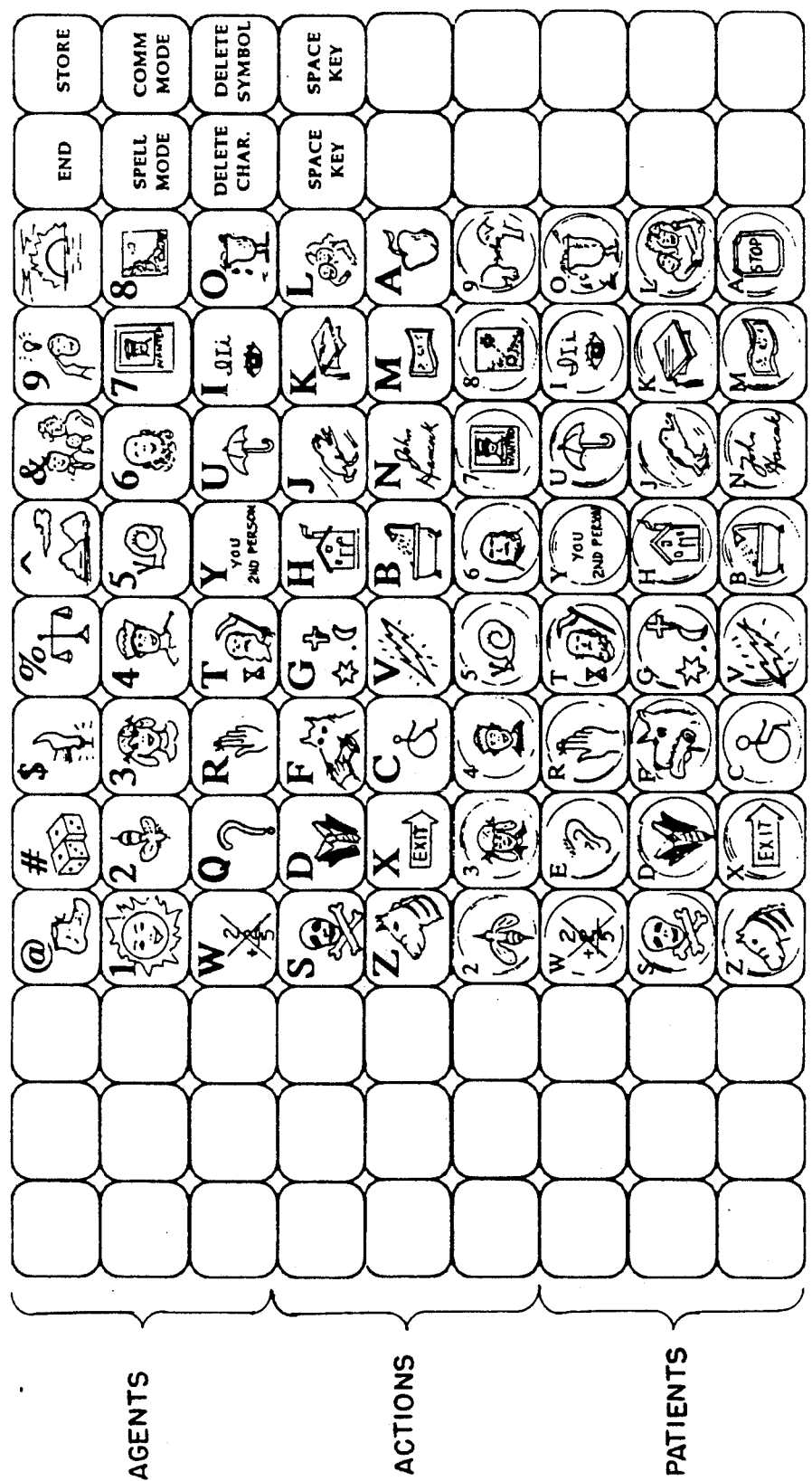
FIG. 3 illustrates a keyboard or input unit in a preferred embodiment of the present invention.

FIG. 3 shows a keyboard of one preferred embodiment of the present invention. This preferred embodiment, although only showing syntactic keyboard segmentation, should not be considered limited to such. Semantic and pragmatic segments could further be added, as well as additional syntactic segments not shown in FIG. 3.

With the plurality of icons on the keyboard, a large vocabulary may be represented by various sequences of icons combined together.

The layout of the keyboard, in this preferred embodiment, is preferably that of three rows, each containing eight icons, for each of the three agent, action and patient grammatical segments. Thus, the eight columns and nine rows of the keyboard, corresponding to seventy-two icon keys, are located in the three grammatical segments. This number of keys, and further this particular geographical layout and segmentation of the keys, is merely exemplary and thus should not be considered limiting with regard to the present invention.

Further, regarding the icons shown in FIG. 3, they too, are merely exemplary and should not be considered limiting. The icons may be selectively programmed into the system and can further be selectively assigned for a particular user. A plurality of polysemic icons or symbols may be chosen so as to correspond to both the intellectual level of a user and to the maximization of the ability of the system.

The icons in the three 8-icon columns geographically corresponding to agents, for example, can be combined to form and subsequently access over 300 agents. Similarly, the remaining syntactic segments of the keyboard, utilized to represent patients and actions, each contain three 8-icon columns which can similarly utilize their respective twenty-four icons, in various sequences, to produce over three hundred patients and objects. The central notion behind this layout is that the icons can be sequenced to access a large number of unique words on each grammatical category, the number for exceeding that of the seventy-two iconic keys.

It is the multi-meaning nature of icons and their ability to form sequences that indicate a single notion which give them their expressive combination power. If we use single meaning pictures, instead of the multi-meaning icons of the present invention, we would only be able to represent twenty-four agents, twenty-four patients and twenty-four objects utilizing the same layout. Therefore, it is important to note that the usefulness of an intelligence system, such as the Natural Language Processing System of the present system will be defeated if it makes use of a burdensome interface that places a high physical and/or cognitive load on the operator while placing severe restrictions on the depth of his/her vocabulary. For this reason, the multi-meaning icons are clearly the most appropriate interface media for the Natural Language Processing System of the present invention.

Through the use of the present geographic layout of the keyboard of the present invention, being divided into syntactic sections or segments of agents, actions and patients (also known as subjects, verbs and objects), in combination with the symbol parsing and intelligent word parsing devices of the present invention (the word and symbol parsing layer to be subsequently described), a keyboard indicating a particular morpheme of a word such as -ing, -ed, -s is not always necessary. Tell, telling, tells and told may often be accessed by the same sequence of polysemic symbols, the intelligent word parser finding and deploying the correct form of the word. Thus, the physical load on the user being further reduced. Also, as some users may not be readily familiar with various proper forms of a plurality of words, by only utilizing one symbol sequence to access a single word, morpheme, or phrase and then allowing an intelligent word parsing device to produce a syntactically correct output sentence, any such grammatical errors will be avoided.

Further, through utilization of a keyboard separated into agents, actions and patients, a user need not be concerned as to which word in a sentence is the subject, verb or object. Merely by choosing a particular symbol sequence from each of the syntactic, semantic, or pragmatic segments on the keyboard, the intelligent word parsing device can then output a syntactically or pragmatically correct output sentence irrespective of the order of each of the input symbol sequences. In other words, as a symbol sequence is parsed in a symbol parsing device of the present invention (to be subsequently described) and a particular word is accessed, the syntactic function, or part of speech, associated with the keyboard location of the symbols previously sequenced by the user, will also be transmitted to the intelligent word parsing device. Thus, as a single word, morpheme, or phrase is accessed which corresponds to the input symbol sequence, its designation as an agent, action or patient is output along with the single word, morpheme, or phrase to the intelligent word parsing device.

The following example, and examples throughout the specification, will be given with regard to syntactic keyboard segmentation and a sequence of symbols activated to access a "word". It should be noted that pragmatic and semantic information are conveyed to the symbol and word parsing devices and layers in a manner similar to that of syntactic information. Thus, for the sake of brevity, examples are excluded. Further, morphemes or phrases can be accessed, by symbol sequences and corresponding syntactic, semantic, or pragmatic segment information in a manner similar to that of a word. However, for the sake of brevity, examples utilizing morphemes and phrases will be excluded.

A user who inputs a symbol sequence for accessing the word "peas", for example, from the object section of the keyboard, followed by a sequence representing the word "eat" from the verb section of the keyboard, followed by a sequence representing the word "man" from the subject portion of the keyboard would normally output the sentence "peas eat man". However, in contradistinction, with the system of the present invention, the intelligent word parser would realize that "man" is the subject of the sentence and "peas" is the object of the sentence, and would subsequently output the syntactically correct sentence "man eats peas". (It should be noted that the system of the present invention depending on the input subject, verb and object may also add additional words to the sentence such as the article "the", for example, in front of both "peas" and "man" to produce the syntactically correct output sentence "The man eats the peas". Therefore, it should be clear that the previous example was merely exemplary and utilized only to illustrate the aspects of both the keyboard and intelligent word parser to produce the syntactically correct output sentence irrespective of the order of the input subject, verb and object, and should not be taken as being limiting in any way.)

The keyboard 1 along with a polysemic symbol on each of the plurality Of keys 2, includes a plurality of switches 3 which, when activated, indicate actuation of a particular polysemic symbol by a user. Key actuation is then detected by the central processing unit 6 to determine location of a particular key which has been actuated and to further determine the semantic, syntactic, or pragmatic segment of the keyboard corresponding to the actuated key. It should further be noted that the keyboard 1 of the present invention may vary depending on the intellectual level of the intended operator and further the icons may also vary. These icons are user selectable and may be varied by the user such that icons, to which the user can readily associate, may be used. Therefore, each keyboard itself may be a language which has been designed for, or with, a specific user. Each of the polysemic symbols or icons is rich in associations and in combination, signal sentence ideas in the operator's memory. This enables the generation of single word, morpheme, or plural word messages (phrases)

by the actuation of two keys or as many as several keys. The keyboard, in combination with the other devices of the natural language processing system, may generate hundreds of syntactically or pragmatically correct output sentences because of the ease with which the polysemic symbols on the keys portray the production of whole thoughts.

As previously mentioned, key actuation is detected by the central processing unit 6. This central processing unit (CPU) may be, for example, a microprocessor. The microprocessor is used in combination with the memory 7 to form the symbol parsing layer or device 5 of the present invention. Upon a user inputting a plurality of polysemic symbols through the keyboard 1, the microprocessor can then detect the sequence of symbols previously actuated and can compare the input symbol sequence to the previously stored symbol sequence in the memory 7 and thereby access a corresponding sequence of polysemic symbols from the memory 7. Upon matching the input sequence of polysemic symbols with those previously stored in the memory 7, the microprocessor can then access a single, morpheme, word or phrase previously stored in the memory 7 with the corresponding previously accessed sequence of polysemic symbols. Therefore, upon the user inputting a particular sequence of polysemic symbols, a particular word, words or phrase previously stored can be accessed by the symbol parsing device 5.

The memory 7, while storing a plurality of symbol sequences, further stores one word, morpheme, or a phrase comprising a plurality of words, corresponding to each of the stored symbol sequences. A morpheme, for example, for past tense may exist on a key of the keyboard. Further, a morpheme, for example, can be accessed from memory to subsequently indicate to the intelligent word parsing layer or device that the verb in a sentence is past tense. If a user inputs symbols to access the words "I", "tell", and "you", the intelligent word parsing device or layer may not be able to tell from the words in the sentence if the verb "tell" should be "tell", "told" or "am telling". Thus, through utilization of the morpheme for past tense, the intelligent word parser knows to choose "told". Further, in the memory is also information existing such that the CPU 6 must input proper semantic, syntactic, or pragmatic segment information as well as an appropriate sequence of symbols, to access a particular single word, morpheme, word or phrase. Thus, a similar symbol sequence may exist for each of the semantic, pragmatic, or syntactic segments of the keyboard, such as an agent, an action and a patient, each corresponding to a different particular single word, morpheme, or phrase.

The memory 7 further contains grammatical and semantic information corresponding to each accessed word or phrase. An example of grammatical and semantic information which might be stored in the memory is the designation of a substantive (noun or pronoun) as first, second, or third person. Further, for a verb, there may exist information dictating whether the verb is a transitive verb or an intransitive verb and whether the verb is regular or irregular (e.g., adding an s to the verb when the subject is plural means the verb would be regular). These examples are merely for illustration. They are simple for the purpose of brevity and should therefore not be considered limiting.

Information stored in the memory 7 is stored prior to operation of the system to correspond to a particular sequence of input symbols. For example, suppose a user has a pet named "Rover". Since "Rover" is not a common everyday word, which may be preprogrammed into the system prior to a user obtaining the system, the ability to input "Rover" into the system to personalize it to a particular user must exist. Such a system exists in the Natural Language Processing System of the present invention and it will be described subsequently how a user can associate the word "Rover" to a particular symbol sequence and further store particular grammatical and semantical information corresponding to the word "Rover" and its symbol sequence. This is by way of illustration and is not limitative of the present invention.

In storing the grammatical and semantic information associated with the word "Rover", a menu driven system exists in the present invention in which a clinician (or the user himself, depending upon his physical and mental abilities) initially stores the word "Rover". A menu is then displayed on display 9. The menu displays, for example, "Action," "Person, place, or thing or "Idea," "Describer," etc. "Person, place, thing or idea" is selected and another menu is displayed with "Animate," and "Inanimate." "Animate" is selected. Another menu is subsequently displayed with "Person" and "Animal." "Animal" is selected. In such a manner, all of the semantic, syntactic, and grammatical information are input into the memory 7 such that they can subsequently be used by the word parsing device of the present invention.

The microprocessor 6 is further connected to a memory 8, thereby forming the intelligent word parsing layer or device of the present invention. This word parsing layer, being activated subsequent to the symbol parsing layer previously described regarding the CPU 6 and the memory 7, exists to intelligently parse a plurality of words, morphemes, or phrases accessed by the symbol parsing device into a syntactically or pragmatically correct output sentence or other word message. When a word, morpheme or phrase is recognized by the symbol layer, the word parsing layer is activated. The word knowledge or grammatic and semantic information corresponding to each word, morpheme, or phrase recognized by the symbol parsing layer is activated and a plurality of parsing heuristics within the word parsing layer, which could apply to the plurality of words, morphemes or phrases recognized by the symbol parsing layer, are also activated. This makes it possible for intelligent decisions to take place about how to add a particular new word and further, how to combine a plurality of words, morphemes, or phrases together. It is the job of the symbol parsing layer to recognize individual symbols or icons and produce single words, morphemes or phrases that are associated with them; the word parsing layer must decide how to put those single words, morphemes, or phrases together to form a sentence in a coherent output utterance, possibly using its built-in knowledge to add some words to the accessed plurality of words, morphemes, and phrases.

Within the memory 8 is a predetermined set of rules which are accessed and to which the previously accessed grammatical and semantic information is applied. By applying this grammatical and semantic information about each of the plurality of words, morphemes, or phrases previously accessed by the symbol parsing layer, words, morphemes, and phrases received from the symbol parsing layer are then reformulated by the word parsing layer into a syntactically or pragmatically correct output sentence or other word message. Additional words may be added to the plurality of accessed words, morphemes, or phrases or various forms of the plurality of accessed words may be changed such that concepts of, for example, subject and verb agreement, take place. Details concerning the word parsing layer will be described subsequently.

Upon the word parsing layer parsing the plurality of words, morphemes, or phrases accessed by the symbol parsing layer into a syntactically or pragmatically correct output sentence or word message, the sentence or word message may then be output to a processor 10. The processor 10 may be a language translator, a voice synthesizer or any other similar type-processor which may processor plural word messages such as the syntactically or pragmatically correct output sentence or word message of the natural language processing system of the present invention. Upon processing the formulated correct output sentence, the message may then be output to a printer 12 to print a desired hard copy of the sentence; a speaker 11 to output a audible message corresponding to the formulated correct output sentence; or any similar output device used to communicate the output sentence to another person such as a display 9. The specialized processor 10, for example, may be one of a commercially speech synthesizer such as the Voltrax speech SPAC within SC-01 voice synthesizer chip therein marketed by Voltrax. The output of the synthesizer, or similar specialized processor, may in turn be coupled to a speaker 14 to generate audible synthetic speech in a manner well known in the art.

Subsequent operation of the system of the present invention, with reference to FIGS. 4a–c, will be subsequently described.

Figure 4B:
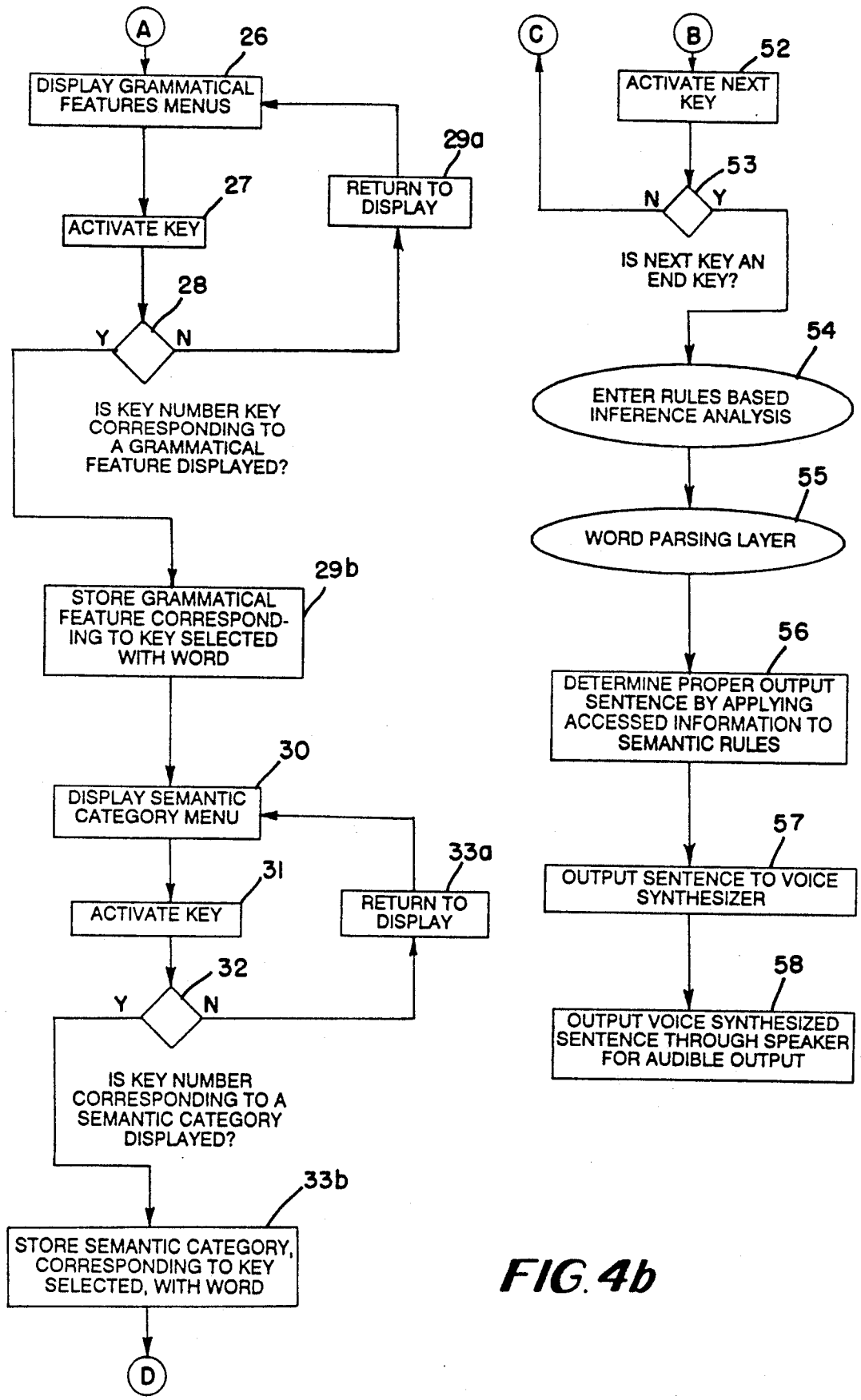
Figure 4C:
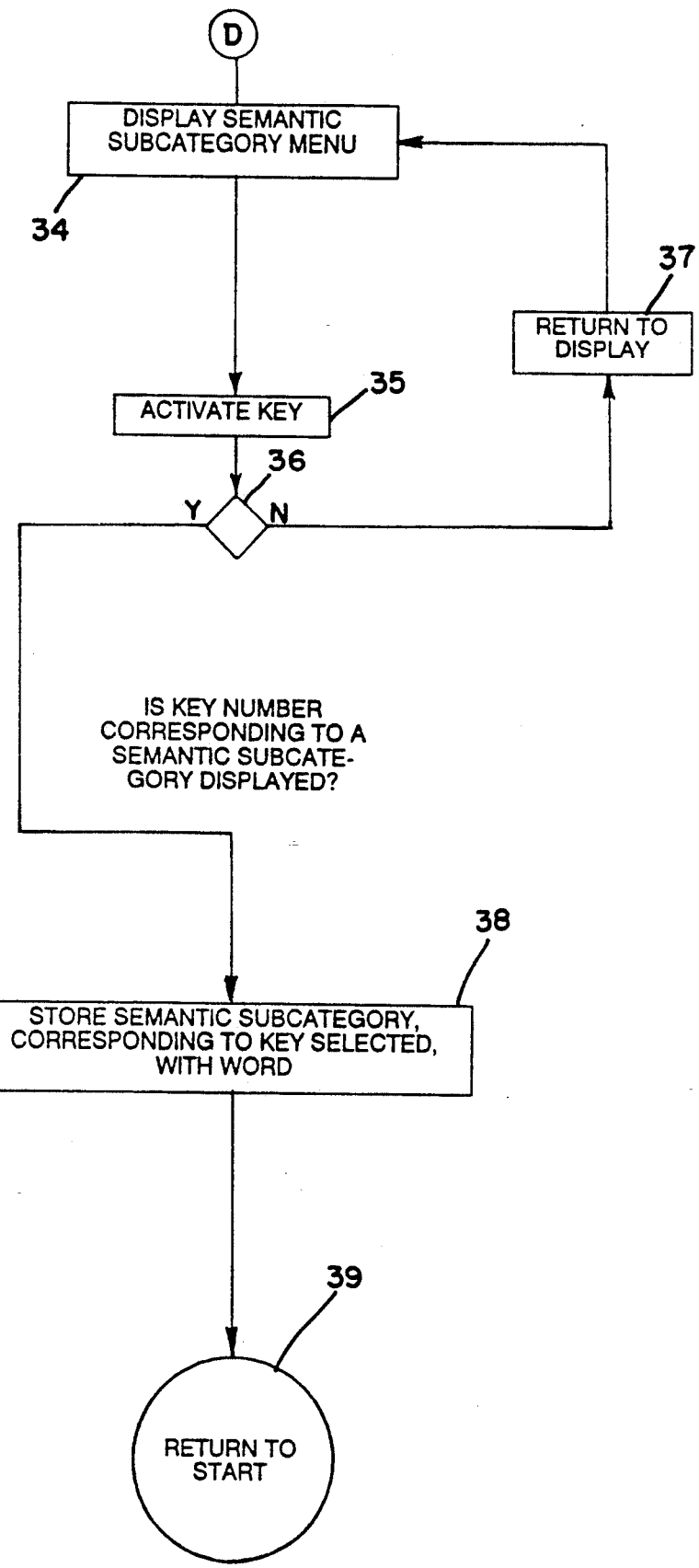

FIGS. 4a–c illustrate a preferred embodiment of the Natural Language Processing System of the present invention. This system will be described regarding a first aspect of associating particular symbol sequences to an input word, phrase, or morpheme, for personalization of the system to a particular user and a second aspect for sequentially storing and displaying the new word, phrase, or morpheme and subsequently storing corresponding grammatical and semantical information with the input word, phrase, or morpheme and its corresponding symbol sequence. Further, operation of the Natural Language Processing System of the present invention initially parsing each of a plurality of sequences of input polysemic symbols to produce a plurality of words, morphemes, or phrases in the symbol parsing layer and subsequent intelligent parsing of the words and phrases into a syntactically or pragmatically correct output sentence and the word parsing layer will subsequently be described. Further, regarding the word parsing layer, operation of the first and second embodiment will also be described. Operation will be described with regard to "words" but the system similarly operates for "phrases" or "morphemes" and thus should not be considered limited to words. Further, keyboard segment information will be described relating only to "syntactic" information but the system similarly operates for pragmatic and semantic information and thus should not be considered limiting.

Referring to the flow chart of FIGS. 4a–c, the system is initially started at 1 shown in FIG. 4a. A first key is activated in step 2 and subsequently in step 3, it is determined whether the store key has been depressed. Upon determining that the store key has been depressed, the mode for storing a new word into the system, to personalize the system to a particular user, for example, is accessed.

Thereafter, a next key is activated in step 4 and subsequently it is determined in step 5 whether or not the next key activated is an icon key. If the next key activated is not an icon key, an error is detected in step 6 and the system is returned to the initial starting step 1. If the next key activated is an icon key, the icon symbol corresponding to the key activated is then stored as the first symbol in a new symbol sequence in step 7. Thereafter, in step 8, a next key is activated and it is determined in step 9 whether or not the next key activated is the "end" key. If the next key activated is not the "end" key, the system then reverts back to step 5 where it is determined whether or not the key activated is an icon key. Upon determining that the activated key is an icon key, the symbol corresponding to the icon key is then stored along with the previously stored symbol to further add to the icon sequence in step 7. This process continues until it is determined, in step 9, that the activated key is an "end" key. Once it is detected that the "end" key has been activated, an icon sequence has thus been formed and the system thereafter progresses to step 10.

At step 10, the next key is activated and it is determined whether or not the key is a character key (one of a letter A–Z) or a space key (usually the space bar or a space key on a keyboard) in step 11. Upon determining that the next key activated is not a character or space key, the system then reverts back to step 6 and an error is detected, subsequently reverting the system back to the start of step 1. However, upon determining that the next key activated is a character or space key, the character or space corresponding to the activated key is stored with a previously stored icon sequence, in step 12. Thereafter, in step 13, a next key is activated and in step 14 it is determined whether or not the next key activated is the "store" key. Upon determining that the next key activated is not the "store" key, the system then subsequently reverts back to step 11 where it is determined whether or not the next key activated is another character or space key. Finally, upon a plurality of characters and spaces in between certain characters being stored corresponding With the stored icon sequence, it is determined in step 14 that the key activated is the "store" key. Thereafter in step 15, the character phrase, morpheme, or word to be associated with the particular icon sequence is then stored in memory and the system returns to the stored step of step 1. A simple example of this aspect of the present invention to allow for the formation of a personalized icon sequence and further a personalized word, morpheme, or phrase associated with an icon sequence, to be stored, will subsequently be given.

Initially, the store key is depressed by the user. Then, the user can depress, in sequential order, the picture of the dog (the key with the letter "F" on it) followed by the picture of the house (the key with the letter "H" on it). Subsequently, the user will depress the "END" key. The user will then depress the characters "R", "O", "V", "E", and "R". Finally, the user will select the "store" key to thereby store the word "ROVER" with the symbol sequence of the "dog" and the "house" keys. Thus, the symbol sequence and the word corresponding to the particular symbol sequence has been stored.

Subsequently, operation for storing the plurality of grammatical and semantical information corresponding to the word to be accessed (in this present example, "ROVER") will subsequently be described with regard to FIGS. 4a–c.

In FIG. 4a, in step 3, upon it being determined that the activated key is not the "store" key, the system progresses to step 16 wherein it is determined whether or not the key depressed is the spell mode key. Upon the system detecting that the key depressed is the spell mode key, a character key is subsequently activated in step 17. The system then progresses to step 18 where the characters corresponding to the previously activated key of step 17 are sequentially displayed. Then, in step 19, the next key is activated and in step 20, it is determined whether or not the key activated is an "END" key. Upon determining that the key is not an "END" key, the character corresponding to the activated key is then displayed as the system reverts back to step 18. In this manner, the word "ROVER", for example, can be sequentially and cumulatively displayed for the user. Subsequently, upon it being determined that the activated key is an "END" key in step 20, the system moves to step 21 where a "parts of speech category" menu is displayed. This menu allows a user to select a particular part of speech corresponding to the previously input word. The menu may display, for example, as follows:

(1) Action,
(2) Person, place, thing or idea,
(3) Describer, etc., such that the user need only access a number key corresponding to one of the numbers of a part of speech displayed, relating to the input word "ROVER". Therefore, in step 22, the next key is activated and subsequently in step 23, it is determined whether or not the key activated corresponds to a number of a particular part of speech previously displayed in step 21. If the activated key does not correspond to such a number, the system returns in step 24, to display step 21. Therefore, corresponding to the previous example utilizing the word "ROVER", the user would merely select the number "2" corresponding to "Person, place, thing or idea". Accordingly, in step 25, a particular part of speech would be stored as grammatical and semantic information with the word "ROVER" in the memory 7.

The system then moves to A in FIG. 4b. Next, in step 26, a "grammatical features" menu is then displayed. Similar to the parts of speech category menu, the grammatical features menu would display, for example, as follows:

(1) Animate
(2) Inanimate etc. Accordingly, in step 27, the user would activate a key and in step 28, it would be determined whether the key activated corresponds to a number previously displayed corresponding to one of the displayed grammatical features of the "grammatic features" menu. If the activated key did not correspond to such a number, the system would return to the display step 26, in step 29a. However, if the activated key corresponded to such a number, in step 29b, the system would store the grammatical feature corresponding to the key selected, with the word. Therefore, with the word "ROVER", would be stored "Animate" upon selection of the number "1".

Thereafter, in step 30, the system would then display a "semantic category" menu displaying, for example, as follows:

(1) Person
(2) Animal etc. Thereafter, the user would then activate a key in step 31 and in step 32, it would be determined whether or not the key activated corresponded to one of the numerals displayed which corresponded to one of the "semantic categories". If the key was not such a numeric key, the system would revert back to display step 30, in step 33a. Therefore, for example, the user may select numeral 2 and thus, in step 33b, the word "ANIMAL" would be stored as the semantic category corresponding to the word "ROVER".

Similarly, a plurality of grammatical and semantic information can be stored with each of a plurality of words corresponding to a plurality of symbol sequences in the memory 7, corresponding to such information as to whether a particular noun is singular or plural or whether the noun is of first person, second person or third person. It should be noted that these particular features previously discussed are given by example only, and should not be considered limiting with regard to the present invention. Any number of grammatical, semantic and further syntactic information can be stored with each single word, morpheme, or phrase corresponding to any number of symbol sequences.

Further, it should also be noted that depending upon the keyboard location of the particular keys to be activated in a symbol sequence, different words, morphemes, or phrases, and grammatical and semantic information can be stored for a similar symbol sequence. For example, if "ROVER" is to be designated as a potential subject for a sentence, the keys corresponding to the "DOG" and "HOUSE" should be depressed in the syntactic segment of the keyboard corresponding to agents. Therefore, if the symbols are depressed in the agent segment of the keyboard, a particular symbol sequence corresponding to "DOG" and "HOUSE" will access "ROVER", but will also access grammatical and semantic information which correspond to utilization of "ROVER" as the subject of the sentence. However, if "ROVER" is to be utilized as the object of the sentence, the user will depress the "DOG" key and the "HOUSE" key in the patient syntactic segment of the keyboard. Subsequently, the word "ROVER" corresponding to the "DOG" key and the "HOUSE" key will be accessed similarly to that previously described, but the particular grammatical and semantic information stored in memory 7 along with the "ROVER" will be information directed toward utilization of "ROVER" as the object of a sentence. This different grammatical and semantic information for the same word "ROVER" accessed by the same symbol sequence "DOG" and "HOUSE" will be dictated by recognition of the particular syntactic segment of the keyboard from which the keys have been activated. It is this combination of syntactic segment information designating each corresponding polysemic symbol as one of an agent, action and patient, along with a particular sequence of polysemic symbols, which access both the stored word, morpheme, or phrase and corresponding grammatical and semantic information from the memory 7.

Therefore, as shown in FIG. 4c, similar to that previously described, the system would then progress from step 33 to D to step 34 to possibly display a semantic subcategory menu wherein a key would be activated in step 35. Then, in step 36, it would be determined if the numerical key corresponding to a "semantic subcategory" displayed had been activated. Accordingly, if such a numerical key had not been activated, the system would return to step 34, and then return to display step 37. However, if the key activated corresponded to a numerical key corresponding to a semantic subcategory displayed, the system would progress to step 38 to thereby store the semantic subcategory corresponding to the key selected, with the previously stored word, morpheme, or phrase. Accordingly, as previously discussed, not only can the new word "ROVER" be stored in memory 7, but a particular symbol sequence to access the word "ROVER" can be generated, to suit the particular needs of a user, by utilizing a symbol sequence he or she can readily associate with the word "ROVER". Also corresponding grammatical and semantic information can additionally be stored with the word "ROVER" to be subsequently utilized in the intelligent word parsing layer of the present invention.

Accordingly, the particular aspects of storing a personalized word and further a personalized symbol sequence, along with corresponding grammatical and semantic information to be subsequently utilized in an intelligent word parsing layer of the present invention, have been described. Subsequently, actual use of the Natural Language Processing System of the present invention, will now be described with regard to FIGS. 4a and 4b.

Upon the system determining that the key depressed is not the character mode key, in step 16, the system then progress to step 40 where it is determined whether or not the key depressed is an icon key. Upon determining that the key depressed is not an icon key, the system returns to "START" indicating that an error has been detected in step 41. This notation of an error detected in step 41 and further the return to "START" from step 40 is merely being utilized for illustrative purposes. Since only a limited number of possibilities of determining which key has been selected is shown with regard to FIGS. 4a-c, the remaining possibilities are noted as error notations. However, as previously mentioned, FIG. 4a-c are merely given for illustrative purposes only and are not to be considered limiting with regard to the present invention. For example, the system can further detect if the activated key is any number of other keys, other than the store key of step 3, spell mode key of step 16 and icon key of step 40.

Upon determining in step 40 that the activated key is an icon key, the microprocessor 6 then detects and identifies the keyboard location of the icon key depressed. By identifying the location of this key, the microprocessor can then determine which polysemic symbol corresponds to that particular key and further to which syntactic, semantic, or pragmatic segment the activated key corresponds. Therefore, the microprocessor can determine if the key depressed is one of an agent, action and patient, for example. A key is activated by being depressed and thereby the switch 3 is closed. The microprocessor detects this closing of the switch and thereby can detect keyboard location of a particular key activated. Further, separate detectors can be utilized in the present Natural Language Processing System to detect each one of the agent, action and patient syntactic segments to which a key may belong. However, in a preferred embodiment, additional binary bits are merely detected by the microprocessor, the binary bits corresponding to one of agent, action and patient syntactic segment. Thereby, upon the microprocessor detecting which of a plurality of polysemic symbols a key corresponds, it can further detect the syntactic segment of the keyboard to which the activated key corresponds.

Upon detecting and identifying the keyboard location of the previously activated icon key, the microprocessor then temporarily stores the icon symbol as an icon sequence in step 42 and further stores the keyboard location of the last activated key. This temporary storing can be done in a temporary memory, for example, a random access memory located within the central processing unit 6.

Thereafter, the system moves to step 43 where the microprocessor then compares the temporarily stored icon sequence to a plurality of icon sequences previously stored in memory 7. As previously described, the memory 7 stores a plurality of icon sequences for accessing a word, morpheme, or phrase and further accessing corresponding and previously stored, grammatical and semantic information corresponding to the stored word, morpheme, or phrase.

Upon determining that the icons do not form an icon sequence in step 44, the system then moves to step 45 where the next key is activated. In step 46, it is determined whether or not the next key activated is an icon key. Upon determining that the next key activated is not an icon key, the system then moves to step 47 where an error is detected and subsequently the system is restarted. However, upon determining that the next key activated is an icon key, the activated key is detected and its keyboard location is identified in step 41. The system then proceeds to steps 42, 43 and 44, where the icons corresponding to sequentially activated keys are temporarily stored as an icon sequence and compared to previously stored icon sequences in memory, until it is finally determined in step 44 that the icons do form an icon sequence.

The system progresses to step 48 wherein the keyboard location the last key activated is utilized. The microprocessor compares this keyboard location to stored data to determine the icon sequence as an agent, action or patient. Thereafter, in step 49, utilizing both the determination of an agent, action or patient, and further the icon sequence, the microprocessor then accesses memory 7 to find the word or phrase which corresponds to the icon sequence and determined agent, action or patient. Thus, a plurality of icon sequences could exist which are identical, one each for an agent, action and patient, each corresponding to different stored words, morphemes, and phrases.

Subsequent to step 49, in step 50, grammatical and semantical information, previously stored and corresponding to the accessed word, morpheme, or phase of step 49, are then obtained from memory 7. This grammatical and semantic information includes, for example, the previously stored part of speech, grammatical feature, semantic category and semantic subcategory corresponding to the previously accessed word, morpheme, or phrase.

The system then progresses to step 51 where this accessed information corresponding to the accessed word, phrase, or morpheme and further the accessed grammatical and semantic information, is then stored for subsequent use in the word parsing layer of the present invention. Thus, at this point, the symbol parsing layer for one input icon sequence, is now complete.

The word parsing layer in a first preferred embodiment of the present invention, is activated upon each word, morpheme, or phrase being recognized by the symbol parsing layer. Before the Natural Language Processing System of the present invention can show understanding of the linguistically complex utterance such as that of the word, morpheme, or phrase activated, it must have a significant body of knowledge about morphology, word meaning, syntax, etc. corresponding to both the word itself, and how that particular word or phrase reacts when combined with other words or phrases to thereby produce a syntactically or pragmatically output sentence. Thus, in order to support intelligent processing, linguistic knowledge general to the English language, or any other language to which the system of the present invention may be programmed, must be built into the Natural Language Processing System of the present invention. It should be noted that in this preferred embodiment, the present invention will be discussed regarding a system producing an English language syntactically or pragmatically correct output sentence or other word message. However, the system should not be limited to such an English language Natural Language Processing System in that various rules corresponding to any particular language, within relm of an ordinary skilled artisian, are also contemplated herein.

The word parsing layer of the present invention operates by making intelligent decisions about words, morphemes, and phrases corresponding to previously input keys by parsing the particular words, morphemes, and phrases together in a syntactically or pragmatically correct manner, through utilization of the previously stored grammatical and semantic information corresponding to each particular word, phrase, and morpheme, and further inferring additional information which has been left out to produce a syntactically or pragmatically correct output sentence. The intelligent word parsing layer of the present invention essentially "reads between the lines" to produce a sentence or other word message merely by accessing a plurality of words, morphemes, or phrases. In contrast to previous systems which merely operate in a simple transduction manner, to access whole sentences to allow the user to get exactly what he types, the Natural Language Processing System of the present invention and specifically the word parsing layer and device, decides where and when to add information to that previously input and accessed whenever it seems intelligent to do so. To support this type of processing, a large body of knowledge must be built into the existing system.

Within the memory 8, a predetermined hierarchy of rules are stored with which the microprocessor can apply accessed words, morphemes, and phrases and their corresponding grammatical information, to subsequently produce a syntactically or pragmatically correct output sentence. Knowledge about various aspects of a particular language, for example, English, are stored in the memory 8 in the form of world knowledge, word knowledge and parsing heuristics, for example. World knowledge is a representation of abstract concepts in the world, e.g., actions, objects, along with their semantic properties which can be used by the Natural Language Processing System to make decisions during word parsing. Word knowledge is knowledge about the concrete concepts that are referenced by the user (e.g., the verb "to eat", the noun "Peas", along with their associated linguistic properties, e.g., agreement features, subcategorization, etc.). Each word representation includes a reference to the abstract concept that the particular word exemplifies. Parsing heuristics exist in the form of the set of rules about word knowledge and world knowledge, which can be used by the system during word parsing to add information to what the user has already entered or to guide the user during the rest of the input. Similar rules for phrases or morphemes also exist but are not included for the sake of brevity.

During symbol parsing the plurality of input symbols and syntactic, semantic, or pragmatic segment information (dictating each key as one of an agent, action and patient, for example) are accessed at what can be referred to as a transduction level, which accepts sequences of symbols from the user and produces domain concepts (here, word, morphemes, or phrases) in the symbol parsing layer. The word parsing layer is the additional processing layer which is activated after each word, morpheme, or phrase is recognized by the symbol parsing layer. When a word, morpheme, or phrase is recognized by the symbol parsing layer, the word parsing layer is activated. The word knowledge that is defined for the new word, morpheme, or phrase is activated, and any parsing heuristics which can apply to the new word, morpheme, or phrase are also activated, making some intelligent decisions about how to add this new word, morpheme, or phrase to the utterance being defined. It is the job of the symbol parsing layer to recognize individual symbols or icons and produce the words, morphemes, or phrases that are associated with them and it is the job of the word parser to decide how to put those words, morphemes, or phrases together to form a coherent output sentence. The word parser utilizes its built-in knowledge to add some content to the accessed words and thereby produces a syntactically or pragmatically correct output sentence.

An example of some of the world knowledge and word knowledge and further some of the parsing heuristics of the word parsing layer, utilizing words, will now be given.

The world knowledge, as previously stated, consists of abstract linguistic concepts (e.g., action, thing) and the word knowledge consists of concrete linguistic concepts (e.g., particular actions or things). Abstract linguistic concepts represent ideas that, for example, intransitive action words take agents as arguments, and transitive action words take both agents and patients as arguments. Concrete linguistic concepts represent information about two particular concepts that the user may refer to. The first one represents the concept "bruce" and indicates that the lexeme associated with that concept is "Bruce". It further represents that this concept represents third person, singular agreement features. A second example of a particular concept represents the concept "eat". The previously stored information in the word parsing layer indicates that this concept is an action and can be realized by the inflected verbs "eat" and "eats" when certain agreement features are present in the subject.

Parsing heuristics are rules that can be used by the word parsing layer to infer something about the input that was not explicitly given. One example, which will be subsequently discussed, refers to the word parsing layer of the present invention, inferring a particular inflection of the main verb that should be used, thereby freeing the user from typing a distinct key which indicates this information. In other words, the user need only access the particular verb by inputting a particular symbol sequence through symbols located in the agent grammatical segment on the keyboard and does not need to type in the particular tense of the verb. This particular tense will be inferred by the word parsing layer.

A parsing rule has a name and a list of arguments. It may bind some previous words. Finally, a rule has a set of statements that are evaluated. Usually, a rule takes the form of a conditional statement "If . . . then . . . " that only succeeds in certain contexts.

In the word parsing layer of the present invention, in this first preferred embodiment of the present invention, the rules operate in a sequential predetermined hierarchy. In other words, upon the system entering the word parsing layer of the present invention, it is detected which was the last word, morpheme, or phrase that was activated or accessed by the symbol parsing layer and further detects the sequence of words, morphemes, or phrases which have been previously activated. For example, here is a simple heuristic rule that determines subject-verb agreement:

```
        (defprule     subject-verb-agreement(newframe
sequence)
        (let((previous (lastframe) sequence)))
        (cond ((and (? action newframe)
        (? entity previous))
        (ruletrace "making verb -a agree with subject -a."
        newframe previous)
        (add-value     newframe     :agreement(agreement
previous)))))).
```

This rule binds the word, phrase, or morpheme previous to the last word, phrase, or morpheme and its corresponding grammatical and semantic information, before the new word, phrase, or morpheme and its corresponding grammatical and semantic information are activated. In the test part of this conditional statement, the word parsing layer checks to see if the previous word, phrase, or morpheme and its corresponding grammatical and semantic information was a type of entity, and to see if the new word, phrase, or morpheme and its corresponding grammatical and semantic information was a type of action. If this is the case, it assumes that the previous word, phrase, or morpheme and its grammatical and semantic information is the subject of what will be the output sentence, and that the new word, phrase, or morpheme and its corresponding grammatical and semantic information is the main verb, and that the two must agree. Subject-verb is enforced by copying the agreement features from the previous word, phrase, or morpheme and its corresponding grammatical and semantic information. An example parse will now be discussed.

In this example, a plurality of input keys forming a symbol sequence, are initially utilized to access the agent "Bruce", the action "EAT", and the patient "PEAS". The system initially determines that "bruce" is a proper name referring to "Bruce". The subject-verb agreement rule copies the agreement feature that "Bruce" is third person singular to the verb or action. The system then chooses the lexeme "eats", noting that the verb "eat" is a regular verb and that "Bruce" is third person singular. It thus adds "s" to thereby chose the lexeme "eats". Finally, the system recognizes the patient "peas" and thereby outputs the syntactically correct sentence "Bruce eats peas". This example is merely given on a simplistic level to show the intelligent aspects of the word parsing layer. It should be noted that this is only an example parse and should thus not be considered limiting to the present invention. The word parsing layer of the present invention comprises a plurality of hierarchically arranged rules which apply to the various accessed words, morphemes, and phrases, to subsequently produce a syntactically or pragmatically correct output sentence.

The word parsing layer of the present invention stores rules which can be utilized in an intelligent manner to parse symbols accessed in the previously mentioned symbol parsing layer. The word parsing layer uses grammatical and semantic information about each of the plurality of words, morphemes, and phrases accessed via the symbol parsing layer to make intelligent decisions about the user's input, producing a complete and syntactically or pragmatically correct output sentence from a partial, and perhaps badly ordered input. In other words, since the keyboard is set up in a plurality of syntactic, semantic, or pragmatic segments, one each corresponding to agent, action and patient, for example, the user need not have any knowledge of the ordering of agents, actions and patients in an subject-verb-object grammatical order. The user, as long as he inputs one of an agent, action and patient, in any order, will be able to produce a syntactically or pragmatically correct output sentence through the intelligent word parsing of the word parsing device of the present invention.

For each word that the system knows, at least two types of information, for example, may be stored in the memory 7. First the system must know about the grammatical nature of the word, phrase, or morpheme. For example, for the word "boys", the system must know that "boys" is a noun, that it is plural, and that it has third person agreement. Second, the system must know about the semantic nature of the word. For example, it must know that "boys" refers to animate humans. The system must store similar information about verbs. For example, for the verb "eat", it must store the information that "eat" is a verb with certain inflections (for tense, number, etc.). It must also store information about the semantic natures of "eat", that it represents an action whose agent is usually animate and whose patient (direct object) is usually edible. These types of grammatical and semantic information are exemplary of those stored with the word, morpheme, or phrase in the memory 7, and are accessed with their corresponding word, morpheme, or phrase by the symbol parsing device. This information is transferred and is thus accessible to the word parsing device and the word parsing layer of the present invention.

This linguistic knowledge, along with the geographic keyboard layout designating each word, for example, as an agent, action or patient, is used by the system to infer the semantic rules of each word, phrase, or morpheme which appears in the input. This ability, on the part of the system, will make it capable of providing individual who experienced disordered syntax with a true language prosthesis. Once the system has determined the agent of the input sentence, it can also enforce the rule of subject-verb agreement by comparing grammatical knowledge stored for the agent (here "boys") with the inflection stored for the verb, selecting the inflection with the proper agreement. Thus, the system will inflect verbs automatically based on the rule of subject-verb agreement.

In a further preferred embodiment of the present invention, as is shown in FIG. 4b, the system moves from B in 4a to B in FIG. 4b and in step 52, it will then detect activation of a next key. Thereafter, in step 53, it will determine whether the next key is an "end" key and if not, will then move from C in 4b to C in FIG. 4a and subsequently return to step 3 of FIG. 4a to determine whether the key activated is a "store" key, to step 16 to determine whether the key activated is a "spell" mode key, and finally to step 40 to determine whether the key is a icon key. By such a system, the present invention can be utilized, in a second preferred embodiment, to access a plurality of words, morphemes, or phrases via a plurality of input symbol sequences, prior to the operation of intelligent word parsing layer.

Therefore, in this second embodiment of the present invention, each of a plurality of words, for example, and their corresponding grammatical and semantic information, previously accessed by the symbol parsing device, can all be stored prior to the word parsing device. Thus, the aforementioned hierarchy of rules of the word parsing device will be accessed upon accessing all of the plurality of words, for example, to be utilized by the user in subsequently producing his output sentence. This differs from the first preferred embodiment of the present invention wherein the word parsing device operates immediately after the first word has been accessed and sequentially operates after each word is accessed. In the second preferred embodiment, the word parsing device does not operate until all of the words, morphemes, or phrases are accessed, as shown in FIGS. 4a and 4b.

Upon all the words, for example, being accessed, by each of the plurality of polysemic symbol sequences being entered, the user then depresses the "END" key. In step 53, it is detected that the "END" key has been depressed and thus the system enters the rule based inference analysis of the word parsing layer in step 54. In step 55, the word parsing layer is accessed and the word parsing device receives and subsequently applies each of the plurality of accessed words, morphemes, or phrases to a predetermined hierarchy of rules and, based upon the corresponding grammatical and semantic information, parses the received plurality of accessed words, morphemes, and phrases into a syntactically or pragmatically correct output sentence in step 56. In step 57, this output sentence is output to a voice synthesizer and subsequently, in step 58, the output sentence is voice synthesized through a speaker 11, for example, for audible output. It should be noted that the voice synthesization step of 57 and 58 take place after the word parsing layer in both the first and second embodiments of the present invention.

The semantic compaction technique of utilizing polysemic symbol sequences to represent a plurality of words, in combination with the syntactic, semantic, or pragmatic segmenting of a keyboard into that of an agent, action and patient, for example, and further the utilization of intelligence parsing, simultaneously offer enriched functionality and reduced cognitive and physical loading of a user. It is this communicative power of multi-meaning icons that allows intelligent parsing to achieve its fullest potential. Further, because icons can be used to encode a rich semantic context with very few key actuations, the user's cognitive and physical load is minimized.

It is essential to note that the intelligent parser that does not use multi-meaning icons cannot take full advantage of this reduction. Actuating the eclesiastical, semantic and syntactic aspects of the system by spelling, letter codes and abbreviations would be immensely complex and laborious. Inputting to an intelligent language generator with multi-meaning icons, dramatically decreases the number of actuations to be made as well as the total number of keys involved. Thus, the intelligence parsing of the present invention becomes a reality as a communication aid for the vast majority of communication aid users by its implementation of the symbol parsing of multi-meaning sequence icons.

From the above-described embodiments of the present invention, it is apparent that the present invention may be modified as would occur to one of ordinary skill in the art without departing from the scope of the present invention and should be defined solely by the appended claims. Changes and modifications of the system contemplated by the present preferred embodiments will be apparent to one of ordinary skill in the art.

What is claimed is:

1. A natural language processing system for initially parsing each of a plurality of sequences of input polysemic symbols, each sequence including a plurality of input polysemic symbols and accessing a single word, morpheme, or phrase, and subsequently combining each of the single words, morphemes, or phrases into a syntactically or pragmatically correct word message, the system comprising:

input means, segmented into a plurality of syntactical, semantic, or pragmatic segments, each such segment including a plurality of keys, each key including one of said polysemic symbols, for inputting syntactic, semantic, or pragmatic segment information and the corresponding polysemic symbol of an actuated key;

first memory means for storing a plurality of symbol sequences, each of said symbol sequences including a plurality of polysemic symbols and syntactic, semantic, or pragmatic segment information, a word, morpheme, or phrase for each of said plurality of symbol sequences, and grammatical and semantic information corresponding to each word, morpheme, or phrase;

symbol parsing means, operatively connected to said input means and said memory means, for detecting each of a plurality of actuated keys, parsing a plurality of polysemic symbols corresponding to sequentially actuated keys, and comparing said parsed sequence of polysemic symbols and syntactic, semantic, or pragmatic segment information corresponding to the sequentially actuated keys, to thereby access a previously stored word, morpheme or phrase and corresponding previously stored grammatical and semantic information; and word combining means, operatively connected to said symbol parsing means, for sequentially accessing each of a plurality of predetermined rules and applying the plurality of predetermined rules to said grammatical and semantic information corresponding to a plurality of words, morphemes, or phrases received from said symbol parsing means to obtain a syntactically or pragmatically correct word message.

2. The natural language processing system of claim 1, further including:

second memory means, operatively connected to said word combining means, for storing said plurality of predetermined rules.

3. The natural language processing system of claim 2, wherein said first and second memory means are erasable programmable read only memories (EPROMs).

4. The natural language processing system of claim 3, further comprising:

voice synthesizing means, operatively connected to said word combining means, for receiving and voice synthesizing said syntactically or pragmatically correct word message; and output means, operatively connected to said voice synthesizing means, for receiving and outputting said voice synthesized syntactically or pragmatically correct word message as an audible message.

5. The natural language processing system of claim 4, wherein said output means is a speaker.

6. The natural language processing system of claim 5, wherein said syntactic, semantic, or pragmatic segments includes an agent segment, an action segment, and a patient segment, each including a plurality of keys.

7. The natural language processing system of claim 6, wherein said word combining means receives a word, morpheme, or phrase corresponding to a sequence of polysemic symbols from each of said agent segment, said action segment, and said patient segment.

8. The natural language processing system of claim 7, wherein said word combining means integrates said received plurality of words, morphemes, or phases irrespective of sequential receiving order from said symbol parsing means, corresponding to said agent segment, said action segment, and said patient segment.

9. The natural language processing system of claim 8, wherein said word combining means sequentially applies each of the plurality of predetermined rules to the grammatical and semantic information, corresponding to each of the plurality of words, morphemes, or phrases upon receipt of each of the plurality of words, morphemes, or phrases to thereby produce said syntactically or pragmatically correct word message.

10. The natural language processing system of claim 8, wherein said word combining means applies each of the sequentially accessed plurality of predetermined rules to the grammatical and semantic information, corresponding to each of the plurality of words, morphemes, or phrases, upon receipt of all of the plurality of words, morphemes, or phrases from said symbol parsing means.

11. The natural language processing system of claim 3, further comprising:

language translation means, operatively connected to said word combining means, for receiving and translating said syntactically or pragmatically correct word message from a first language into a designated target language; and output means, operatively connected to said language translation means, for receiving and outputting said translated word message as an audible message.

12. The natural language processing system of claim 11, wherein said output means is a speaker.

13. The natural language processing system of claim 1, further comprising:

voice synthesizing means, operatively connected to said word combining means, for receiving and voice synthesizing said syntactically or pragmatically correct word message; and output means, operatively connected to said voice synthesizing means, for receiving and outputting said voice synthesized syntactically or pragmatically correct word message as an audible message.

14. The natural language processing system of claim 13, wherein said output means is a speaker.

15. The natural language processing system of claim 1, further comprising:

language translation means, operatively connected to said word combining means, for receiving and translating said syntactically or pragmatically correct word message from a first language into a designated target language; and output means, operatively connected to said language translation means, for receiving and outputting said translated word message as an audible message.

16. The natural language processing system of claim 15, wherein said output means is a speaker.

17. The natural language processing system of claim 1, wherein said syntactic, semantic, or pragmatic segments include an agent segment, an action segment, and a patient segment, each including a plurality of keys.

18. The natural language processing system of claim 17, wherein said word combining means receives a word, morpheme, or phrase corresponding to a sequence of polysemic symbols from each of said agent segment, said action segment, and said patient segment.

19. The natural language processing system of claim 18, wherein said word combining means integrates said received plurality of words, morphemes, or phrases, irrespective of sequential receiving order from said symbol parsing means, corresponding to said agent segment, said action segment, and said patient segment.

20. The natural language processing system of claim 1, wherein said word combining means sequentially applies each of the plurality of predetermined rules to the grammatical and semantic information, corresponding to each of the plurality of words, morphemes, or phrases upon receipt of each of the plurality of words, morphemes, or phrases, to thereby produce said syntactically or pragmatically correct word message.

21. The natural language processing system of claim 1, wherein said word combining means applies, to the grammatical and semantic information, corresponding to each of the plurality or words, morphemes, or phrases, each of said sequentially accessed plurality of predetermined rules, upon receipt of all of the plurality of words, morphemes, or phrases from said symbol parsing means.

22. The natural language processing system of claim 1, wherein said input means includes, input storage means, for actuating a storage mode and for allowing input and subsequent storage in said first memory means of a plurality of symbols forming a new symbol sequence.

23. The natural language processing system of claim 22 wherein said input means further includes, input character means for actuating a character input mode and for allowing input, designation and subsequent storage in said first memory means of a word, morpheme, or phrase corresponding to said stored new symbol sequence.

24. The natural language processing system of claim 23, wherein said input means further includes, input spell mode means for actuating a grammatical and semantic information mode and for allowing input, designation, and subsequent storage in said first memory means of grammatical and semantic information corresponding to said stored new symbol sequence.

25. The natural language processing system of claim 23, further comprising:

display means, operatively connected to said input spell mode means, for displaying a plurality of sequential menus containing grammatical and semantic information for designation by said input spell mode means.

26. The natural language processing system of claim 25, where said sequential menus include a part of speech menu, a grammatical features menu, a semantic category menu, and a semantic subcategory menu.

27. The natural language processing system of claim 22, further comprising:
voice synthesizing means, operatively connected to said word combining means, for receiving and voice synthesizing said syntactically or pragmatically correct word message;
output means, operatively connected to said voice synthesizing means, for receiving and outputting said voice synthesized syntactically or pragmatically correct word message as an audible message.

28. The natural language processing system of claim 27, where said sequential menus include a part of speech menu, a grammatical features menu, a semantic category menu, and a semantic subcategory menu.

29. The natural language processing system of claim 28, wherein grammatical and semantic information is designated, input, and stored via said input spell mode means by a user sequentially selecting information displayed on each of said sequential means.

30. A natural language processing system for initially detecting each of a plurality of sequences of input polysemic symbols, each sequence including a plurality of input polysemic symbols, to produce a plurality of words or morphemes and subsequently combining the plurality of words or morphemes into a syntactically or pragmatically correct word message, the system comprising:
a keyboard, segmented into a plurality of syntactic, semantic, or pragmatic category keyboard sections, each syntactic, semantic, or pragmatic category section including a plurality of keys, each key including one of said polysemic symbols;
first memory for storing a plurality of symbol sequences, each symbol sequence corresponding to a predetermined syntactic, semantic, or pragmatic category and including a plurality of polysemic symbols, said first memory further storing at least one of a plurality of words or morphemes and grammatical and semantic word parsing information corresponding each of said plurality of symbol sequences and a predetermined syntactic, semantic, or pragmatic category;
detecting means, operatively connected to said keyboard, for detecting actuation of each of a plurality of sequentially depressed keys, including corresponding syntactic, semantic, or pragmatic category information and each corresponding polysemic symbol;
comparison means, operatively connected to said detecting means and said first memory, for comparing said detected symbol sequence and corresponding syntactic, semantic, or pragmatic category, to access said at least one of a plurality of words or morphemes and grammatical and semantic word parsing information corresponding to said detected symbol sequence and corresponding syntactic, semantic, or pragmatic category information from said memory;
word combining means, operatively connected to said comparison means, for receiving a plurality of words or morphemes accessed by said comparison means, and for applying a plurality of predetermined rules to each of the plurality of words or morphemes based upon the grammatical and semantic word parsing information corresponding to each of the plurality of received words or morphemes, and for combining said plurality of received words or morphemes into a syntactically or pragmatically correct word message.

31. The natural language processing system of claim 30, wherein said plurality of syntactic, semantic, or pragmatic categories and predetermined syntactic, semantic, or pragmatic categories include at least one of an agent, action, and patient.

32. The natural language parsing system of claim 31, wherein said plurality of words or morphemes received by said word combining means, includes at least one word corresponding to each of a symbol sequence of the agent syntactic category, the patient syntactic category and the action syntactic category.

33. The natural language processing system of claim 32, wherein said word combining means integrates said received plurality of words or morphemes, irrespective of sequential receiving order from said comparison means, corresponding to said agent syntactic category, patient syntactic category and action syntactic category.

34. The natural language processing system of claim 30, wherein said word combining means may add words, to said plurality of received words or morphemes, to produce said syntactically or pragmatically correct word message, dependent upon said application of said plurality of predetermined rules.

35. The natural language processing system of claim 30, further including:
second memory, operatively connected to said combining means, for storing said plurality of predetermined rules.

36. The natural language processing system of claim 35, wherein said first and second memories are erasable programmable read only memories (EPROMs).

37. The natural language processing system of claim 30, further comprising:
voice synthesizing means, operatively connected to said word parsing means, for receiving and voice synthesizing said syntactically or pragmatically correct word message output;
output means, operatively connected to said voice synthesizing means, for receiving and outputting said voice synthesized syntactically or pragmatically correct word message as an audible message.

38. The natural language processing system of claim 37, wherein said output means is a speaker.

39. The natural language processing system of claim 30, further comprising:
language translation means, operatively connected to said word combining means, for receiving and translating said syntactically or pragmatically correct word message from a first language into a designated target language;
output means, operatively connected to said language translation means, for receiving and outputting said translated word message as an audible message.

40. The natural language processing system of claim 39, wherein said output means is a speaker.

41. The natural language processing system of claim 30, wherein said word combining means sequentially applies the plurality of predetermined rules to the grammatical and semantic information, corresponding to each of the plurality of words or morphemes upon receipt of each of the plurality of words or morphemes to thereby produce said syntactically or pragmatically correct word message.

42. The natural language processing system of claim 30, wherein said word combining means applies the plurality of predetermined rules to the grammatical and semantic information, corresponding to each of the plurality of words or morphemes upon receipt of each of the plurality of words or morphemes from said comparison means.

43. The natural language processing system of claim 30, wherein said input means includes,
input storage means, for actuating a storage mode and for allowing input and subsequent storage in said first memory of a plurality of symbols for a new symbol sequence.

44. The natural language processing system of claim 23 wherein said input means includes,
input character means for actuating a character input mode and for allowing input, designation and subsequent storage in said first memory means of a word, morpheme, or a plurality of words corresponding to said stored new symbol sequence.

45. The natural language processing system of claim 44, wherein said input means further includes,
input spell mode means for actuating a grammatical and semantic information mode and for allowing input, designation, and subsequent storage in said first memory means of grammatical and semantic information corresponding to said stored new symbol sequence.

46. The natural language processing system of claim 45, further comprising:
display means, operatively connected to said input spell mode means, for displaying a plurality of sequential menus containing grammatical and semantic information for designation by said input spell mode means.

47. The natural language processing system of claim 46, where said sequential menus include a part of speech menu, a grammatical features menu, a semantic category menu, and a semantic subcategory menu.

48. The natural language processing system of claim 47, wherein grammatical and semantic information is designated, input, and stored via said input spell mode means by a user sequentially selecting information displayed on each of said sequential menus.

49. A natural language processing system for initially parsing each of a plurality of sequences of input polysemic symbols, each sequence including a plurality of input polysemic symbols, to produce a plurality of words or morphemes and subsequently combine the plurality of words or morphemes into a syntactically correct word message, the system comprising:
input means for inputting each of a plurality of polysemic symbols, each polysemic symbol input upon actuation of an input key, said actuation of each input key further including syntactic segment information designating each corresponding polysemic symbol as one of an agent, action, and patient;
symbol parsing means, operatively connected to said input means, for parsing a plurality of sequentially input polysemic symbols, into a plurality of input symbol sequences and accessing each of a plurality of words or morphemes previously stored with symbol sequences corresponding to each of said input symbol sequences and a corresponding one of the designated agent, action, and patient, each said accessed word or morpheme further accessing corresponding, and previously stored, grammatical and semantic information;
word combining means, operatively connected to said symbol parsing means, for receiving and subsequently applying a plurality of predetermined rules to each of the plurality of accessed words or morphemes and, based upon the corresponding grammatical and semantic information, for combining said received plurality of accessed words or morphemes, into a syntactically correct word message.

50. The natural language processing system of claim 49, wherein the symbol parsing means includes:
first memory means for storing each of a plurality of symbol sequences, each of a plurality of words or morphemes and corresponding grammatical and semantic information, accessible upon inputting of a corresponding symbol sequence and a corresponding designated one of an agent, action and patient.

51. The natural language processing system of claim 50, wherein said input means includes,
input storage means for actuating a storage mode and for allowing input and subsequent storage in said first memory means of a plurality of symbols forming a new symbol sequence.

52. The natural language processing system of claim 51, wherein said input means further includes,
input character means for actuating a character input mode and for allowing input, designation and subsequent storage in said first memory means of a word, morpheme, or plurality of words corresponding to said stored new symbol sequence.

53. The natural language processing system of claim 52 wherein said input means further includes,
input spell mode means for actuating a grammatical and semantic information mode and for allowing input, designation, and subsequent storage in said first memory means of grammatical and semantic information corresponding to said stored new symbols sequence.

54. The natural language processing system of claim 53, further comprising:
display means, operatively connected to said input spell mode means, for displaying a plurality of sequential menus containing grammatical and semantic information for designation by said input spell mode means.

55. The natural language processing system of claim 50, wherein the word combining means includes:
second memory means for storing said plurality of predetermined rules.

56. The natural language processing system of claim 55, wherein said first and second memory means are erasable programmable read only memories (EPROMs).

57. The natural language processing system of claim 49, further comprising:
voice synthesizing means, operatively connected to said word combining means, for receiving and voice synthesizing said syntactically correct word message;
output means, operatively connected to said voice synthesizing means, for receiving and outputting said voice synthesized syntactically correct word message as an audible message.

58. The natural language processing system of claim 57, wherein said output means is a speaker.

59. The natural language processing system of claim 49, further comprising:
language translation means, operatively connected to said word combining means, for receiving and translating said syntactically correct word message form a first language into a designated target language;
output means, operatively connected to said language translation means, for receiving and outputting said translated word message as an audible message.

60. The natural language processing system of claim 59, wherein said output means is a speaker.

61. The natural language processing system of claim 49, wherein said word combining means receives each of the plurality of words or morphemes corresponding to a sequence of polysemic symbols from each of said agent, action, and patient grammatical segments.

62. The natural language processing system of claim 61, wherein said word combining means applies said plurality of predetermined rules to said received plurality of accessed words or morphemes irrespective of sequential receiving order, from said symbol parsing means, corresponding to said agent, action, and patient syntactic segments.

63. The natural language processing system of claim 49, wherein said word combining means sequentially applies said plurality of predetermined rules to each of the plurality of accessed words or morphemes, as sequentially received based upon corresponding grammatical and semantical information to thereby combine said sequentially received plurality of words or morphemes into a syntactically correct word message.

64. The natural language processing system of claim 49, wherein said word combining means applies said plurality of predetermined rules to each of the plurality of accessed words or morphemes based upon corresponding grammatical and semantic information, to thereby combine upon receipt of all of the words or morphemes, said words or morphemes into a syntactically correct word message.

65. A natural language processing method for initially parsing each of a plurality of sequences of input polysemic symbols, each sequence including a plurality of input polysemic symbols and accessing a single word, morpheme, or phrase, and subsequently combining each of the single words, morphemes, or phrases into a syntactically or pragmatically correct word message, comprising the steps of:
(a) inputting syntactic, semantic, or pragmatic segment information and a corresponding polysemic symbol upon actuation of a key on a keyboard segmented into syntactical, semantic, and pragmatic segments, the keyboard including a plurality of keys and a plurality of corresponding polysemic symbols;
(b) storing a plurality of symbol sequences in a memory, each of the symbol sequences including a plurality of polysemic symbols and syntactic, semantic, or pragmatic segment information, a word, morpheme, or phrase for each of the plurality of symbol sequences, and grammatical and semantic information corresponding to each word, morpheme, or phrase;
(c) detecting each of a plurality of actuated keys, parsing a plurality of polysemic symbols corresponding to sequentially actuated keys, and comparing the parsed sequence of polysemic symbols and syntactic, semantic, or pragmatic segment information corresponding to the sequentially actuated keys, to thereby access a previously stored word, morpheme or phrase and corresponding previously stored grammatical and semantic information; and
(d) accessing, sequentially, each of a plurality of predetermined rules and applying the plurality of predetermined rules to the grammatical and semantic information corresponding to a plurality of words, morphemes, or phrases received, to obtain a syntactically or pragmatically correct word message.

66. The natural language processing method of claim 65, further comprising the step of:
(e) storing the plurality of predetermined rules.

67. The natural language processing method of claim 65, further comprising the steps of:
(e) receiving and voice synthesizing the syntactically or pragmatically correct word message of step (d); and
(f) receiving and outputting the voice synthesized syntactically or pragmatically correct word message of step (e) as an audible message.

68. The natural language processing method of claim 65, further comprising the steps of:
(e) receiving and translating the syntactically or pragmatically correct word message of step (d) from a first language into a designated target language; and
(f) receiving and outputting the translated word message of step (e) as an audible message.

69. The natural language processing method of claim 65, wherein each of the plurality of predetermined rules are sequentially applied to the grammatical and semantic information, corresponding to each of the plurality of words, morphemes, or phrases upon receipt of each of the plurality of words, morphemes, or phrases, to thereby produce said syntactically or pragmatically correct word message.

70. The natural language processing method of claim 65, wherein to the grammatical and semantic information, corresponding to each of the plurality of words, morphemes, or phrases, each of the sequentially accessed plurality of predetermined rules are applied upon receipt of all of the plurality of words, morphemes, or phrases.

71. A natural language processing method for initially detecting each of a plurality of sequences of input polysemic symbols, each sequence including a plurality of input polysemic symbols, to produce a plurality of words or morphemes and subsequently combining the plurality of words or morphemes into a syntactically or pragmatically correct word message, the method comprising the steps of:
(a) inputting syntactic, semantic, or pragmatic information and a corresponding polysemic symbol from a keyboard, segmented into a plurality of syntactic, semantic, or pragmatic category keyboard sections upon key actuation, each syntactic, semantic, or pragmatic category section including a plurality of keys, each key including one of the polysemic symbols;
(b) storing a plurality of symbol sequences, each symbol sequence corresponding to a predetermined syntactical, semantic, or pragmatic category and including a plurality of polysemic symbols in a first memory, the first memory further storing at least one of a plurality of words or morphemes and grammatical and semantic word parsing information corresponding each of the plurality of symbol sequences and a predetermined syntactic, semantic, or pragmatic category;

(c) detecting actuation of each of a plurality of sequentially depressed keys, including corresponding syntactic, semantic, or pragmatic category information and each corresponding polysemic symbol;

(d) comparing the detected symbol sequence and corresponding syntactic, semantic, or pragmatic category, to access the at least one of a plurality of words or morphemes and grammatical and semantic word parsing information corresponding to the detected symbol sequence and corresponding syntactic, semantic, or pragmatic category information from the first memory;

(e) receiving a plurality of words or morphemes accessed in step (d) and applying a plurality of predetermined rules to each of the plurality of words or morphemes based upon the grammatical and semantic word parsing information corresponding to each of the plurality of received words or morphemes, and combining the plurality of received words or morphemes into a syntactically or pragmatically correct word message.

72. The natural language processing method of claim 71, wherein words may be added to the plurality of received words or morphemes, to produce the syntactically or pragmatically correct word message output, dependent upon the application of the plurality of predetermined rules.

73. The natural language processing method of claim 71, further including the steps of:
(f) storing the plurality of predetermined rules in a second memory.

74. The natural language processing method of claim 71, further comprising the steps of:
(f) receiving and voice synthesizing the syntactically or pragmatically correct word message of step (e);
(g) receiving and outputting the voice synthesized syntactically or pragmatically correct word message of step (f) as an audible message.

75. The natural language processing method of claim 71, further comprising the steps of:
(f) receiving and translating the syntactically or pragmatically correct word message of step (e) from a first language into a designated target language; and
(g) receiving and outputting said translated word message of step (f) as an audible message.

76. The natural language processing method of claim 71, wherein the plurality of predetermined rules are sequentially applied to the grammatical and semantic information, corresponding to each of the plurality of words or morphemes upon receipt of each of the plurality of words or morphemes to thereby produce said syntactically or pragmatically correct word message.

77. The natural language processing method of claim 71, wherein the plurality of predetermined rules are applied to the grammatical and semantic information, corresponding to each of the plurality of words or morphemes upon receipt of all of the plurality of words or morphemes.

78. A natural language processing method for initially parsing each of a plurality of sequences of input polysemic symbols, to produce a plurality of words or morphemes and to combine the plurality of words or morphemes into a syntactically correct word message, the method comprising the steps of:

(a) inputting each of a plurality of polysemic symbols, each polysemic symbol input upon actuation of an input key, the actuation of each input key further including syntactic segment information designating each corresponding polysemic symbol as one of an agent, action, and patient;

(b) parsing a plurality of sequentially input polysemic symbols, into a plurality of input symbol sequences and accessing each of a plurality of words or morphemes previously stored with symbol sequences corresponding to each of the input symbol sequences and a corresponding one of the designated agent, action, and patient, each accessed word or morpheme further accessing corresponding, and previously stored, grammatical and semantic information;

(c) receiving and subsequentially applying a plurality of predetermined rules to each of the plurality of accessed words or morphemes and, based upon the corresponding grammatical and semantic information, combining the received plurality of accessed words or morphemes, into a syntactically correct word message.

79. The natural language processing method of claim 78, further comprising:
(d) receiving and voice synthesizing the syntactically correct word message of step (c); and
(e) receiving and outputting the voice synthesized syntactically correct word message of step (d) as an audible message.

80. The natural language processing method of claim 78, further comprising the steps of:
(d) receiving and translating the syntactically correct word message of step (c) from a first language into a designated target language; and
(e) receiving and outputting the translated word message of step (d) as an audible message.

81. The natural language processing method of claim 78, wherein the plurality of predetermined rules are applied to said received plurality of accessed words or morphemes irrespective of sequential receiving order, corresponding to said agent, action, and patient syntactic segments.

82. The natural language processing method of claim 78, wherein the plurality of predetermined rules are sequentially applied to each of the plurality of accessed words or morphemes, as sequentially received, based upon corresponding grammatical and semantical information to thereby combine said sequentially received plurality of words or morphemes into a syntactically correct word message.

83. The natural language processing method of claim 78, wherein the plurality of predetermined rules are applied to each of the plurality of accessed words or morphemes based upon corresponding grammatical and semantic information, to thereby combine upon receipt of all of the words or morphemes, the words or morphemes into a syntactically correct word message.

* * * * *